United States Patent
Nishikawa et al.

(10) Patent No.: US 7,882,432 B2
(45) Date of Patent: Feb. 1, 2011

(54) INFORMATION PROCESSING APPARATUS HAVING FONT-INFORMATION EMBEDDING FUNCTION, INFORMATION PROCESSING METHOD THEREFOR, AND PROGRAM AND STORAGE MEDIUM USED THEREWITH

(75) Inventors: Satoshi Nishikawa, Yokohama (JP); Kazufumi Kobashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 11/242,196

(22) Filed: Oct. 3, 2005

(65) Prior Publication Data
US 2006/0072137 A1 Apr. 6, 2006

(30) Foreign Application Priority Data
Oct. 4, 2004 (JP) .............................. 2004-291450

(51) Int. Cl.
*G06F 17/21* (2006.01)
(52) U.S. Cl. ..................... 715/269; 715/255; 715/256
(58) Field of Classification Search ............... 715/200, 715/209, 243, 250, 255, 256, 269
See application file for complete search history.

(56) References Cited

U.S. PATENT DOCUMENTS

| | | | | |
|---|---|---|---|---|
| 5,583,978 A | * | 12/1996 | Collins et al. ............... | 345/170 |
| 6,782,509 B1 | * | 8/2004 | Hirayama et al. ........... | 715/210 |
| 6,813,747 B1 | * | 11/2004 | Taieb ......................... | 715/269 |
| 6,826,727 B1 | * | 11/2004 | Mohr et al. ................. | 715/235 |
| 2005/0262497 A1 | * | 11/2005 | Ternasky et al. ............ | 717/172 |

FOREIGN PATENT DOCUMENTS

| | | |
|---|---|---|
| JP | 2002-330274 | 11/2002 |
| JP | 2002-334059 | 11/2002 |
| JP | 2003-006183 A | 1/2003 |

OTHER PUBLICATIONS

Ted Padova, "Adobe Acrobat 6 PDF Bible," Oct. 15, 2003, pp. 281-284 and 311-313.*
Ted Padova, "Adobe Acrobat 6 PDF Bible," Oct. 15, 2003, p. 310.*

* cited by examiner

*Primary Examiner*—Joshua D Campbell
(74) *Attorney, Agent, or Firm*—Canon USA Inc IP Division

(57) ABSTRACT

An information processing apparatus and method for embedding font information in an electronic document. The apparatus and method comprise generating an electronic document containing editing instructions, and based on the editing instructions, querying to determine whether font information is to be embedded in the electronic document.

21 Claims, 37 Drawing Sheets

FIG. 4

| | FIG. 4A |
|---|---|
| | FIG. 4B |

FIG. 4A

| NO | ATTRIBUTE INFORMATION | | REMARKS |
|---|---|---|---|
| 1 | PRINTING METHOD | SINGLE-SIDED / TWO-SIDED / BIDING PRINTING | |
| 2 | SHEET SIZE | MANUSCRIPT / FIXED | · WHEN DESIGNATING "A4+A3", "B4+B3", OR "LETTER+LEISURE (11x17), DESIGNATE Z-FOLDING<br>· WHEN DESIGNATING BIDING PRINTING OR N-up PRINTING, MANUSCRIPT SIZE OF 1ST PAGE OF CHAPTER 1 IS AUTOMATICALLY SELECTED |
| 3 | SHEET DIRECTION | LENGTHWISE / CROSSWISE | · SELECTABLE ONLY IN THE CASE OF FIXED SIZE |
| 4 | MARGIN / BINDING DIRECTION | | · SHIFT OR ENLARGEMENT / REDUCTION CAN BE SELECTED |
| 5 | N-up PRINTING | NUMBER OF PAGES / ORDER OF ARRANGEMENT / BORDERS / ARRANGEMENT POSITIONS | · 9 PATTERNS OF ARRANGEMENT POSITIONS<br>· ORIGINAL SIZE PRINTING CAN BE DESIGNATED |
| 6 | ENLARGEMENT / REDUCTION | ON / OFF | · WHEN FIXED SIZE OR N-up PRINTING IS SELECTED AS SHEET SIZE, IT CAN BE AUTOMATICALLY DESIGNATED IN ON- OR OFF-STATE |
| 7 | WATERMARK | | · SEPARATE DESIGNATION IS POSSIBLE IN LOGICAL PAGE UNIT AND IN PHYSICAL PAGE UNIT<br>· FOR ALL CHAPTERS AND ALL PAGES |
| 8 | HEADER / FOOTER | | · SEPARATE DESIGNATION IS POSSIBLE IN LOGICAL PAGE UNIT AND IN PHYSICAL PAGE UNIT<br>· FOR ALL CHAPTERS AND ALL PAGES |

FROM FIG. 4A

| | | | |
|---|---|---|---|
| 9 | SHEET EJECTING METHOD | | · STAPLING AND PUNCHING ONLY FOR SINGLE OR TWO-SIDED PRINTING<br>· 1 OR 2 POSITIONS FOR STAPLING |
| 10 | DETAILS OF BINDING | STAPLE / PUNCH<br><br>OPENING DIRECTION /<br>SADDLE STITCHING /<br>ENLARGEMENT-REDUCTION<br>DESIGNATION / MARGIN /<br>SEPARATION DESIGNATION, ETC. | · ONLY IN THE CASE OF BINDING PRINTING |
| 11 | TOP / BACK COVER | | · PRINTING DESIGNATION FOR TOP COVER 1/2 AND BACK COVER 1/2<br>· DESIGNATION OF SHEET FEEDER (INCLUDING INSERTER) |
| 12 | INDEX PAPER | | · CHARACTER STRING PRINTING ON INDEX PORTION<br>AND ANNOTATION ON INDEX SHEET CAN BE SET<br>· DESIGNATION IS IMPOSSIBLE FOR BINDING PRINTING |
| 13 | SLIP PAPER | | · DESIGNATION OF SHEET FEEDER (INCLUDING INSERTER)<br>· MANUSCRIPT DATA CAN BE PRINTED ON INSERTED SHEET<br>· DESIGNATION IS IMPOSSIBLE FOR BINDING PRINTING |
| 14 | CHAPTER SEPARATION | NONE / PAGE CHANGE /<br>SHEET CHANGE | · WHEN INDEX SHEET OR SLIP SHEET IS DESIGNATED,<br>"PAPER CHANGE" IS FIXED<br>· "SHEET CHANGE" FOR SINGLE-SIDED PRINTING |

FIG. 5

| NO | ATTRIBUTE INFORMATION | | REMARKS |
|---|---|---|---|
| 1 | SHEET SIZE | MANUSCRIPT / FIXED | • WHEN SELECTING FIXED SIZE, "SHEET CHANGE" IS AUTOMATICALLY SPECIFIED<br>• WHEN PLURAL SHEETS ARE SELECTED IN BOOK, SIZE CAN BE CHANGED WITH SPECIFIED TYPE OF SHEETS<br>EVEN IN THE CASE OF DESIGNATION MATCHING BOOK, SIZE CAN BE CHANGED |
| 2 | SHEET DIRECTION | LENGTHWISE / CROSSWISE | • SELECTABLE ONLY IN THE CASE OF FIXED SIZE |
| 3 | N-up PRINTING | NUMBER OF PAGES / ORDER OF ARRANGEMENT / BORDERS / ARRANGEMENT POSITIONS | • 9 PATTERNS OF ARRANGEMENT POSITIONS<br>• ORIGINAL SIZE PRINTING CAN BE DESIGNATED |
| 4 | ENLARGEMENT / REDUCTION | ON / OFF | • WHEN FIXED SIZE OR N-up PRINTING IS SELECTED AS SHEET SIZE, IT CAN BE AUTOMATICALLY DESIGNATED IN ON- OR OFF-STATE |
| 5 | WATERMARK | DISPLAY / NON-DISPLAY | • DESIGNATION OF WHETHER OR NOT TO DISPLAY ALL WATERMARKS DESIGNATED IN BOOK |
| 6 | HEADER / FOOTER | DISPLAY / NON-DISPLAY | • DESIGNATION OF WHETHER OR NOT TO DISPLAY ALL HEADERS / FOOTERS DESIGNATED IN BOOK |
| 7 | SHEET EJECTING METHOD | STAPLE / PUNCH | • WHEN STAPLING IS DESIGNATED IN BOOK, IT CAN BE SWITCHED TO OFF-STATE, AND IS IN ON-STATE BY DEFAULT |

FIG. 6

| NO | ATTRIBUTE INFORMATION | | REMARKS |
|---|---|---|---|
| 1 | PAGE ROTATION DESIGNATION | | • 0, 90, 180, AND 270 DEGREES CAN BE DESIGNATED |
| 2 | WATERMARK | DISPLAY / NON-DISPLAY | • DESIGNATION OF WHETHER OR NOT TO DISPLAY ALL WATERMARKS DESIGNATED IN BOOK |
| 3 | HEADER / FOOTER | DISPLAY / NON-DISPLAY | • DESIGNATION OF WHETHER OR NOT TO DISPLAY ALL HEADERS / FOOTERS DESIGNATED IN BOOK |
| 4 | ZOOM | 50%-200% | • DESIGNATION OF RELATIVE MAGNIFICATION BY USING SIZE MATCHING VIRTUAL LOGICAL PAGE REGION AS 100% |
| 5 | ARRANGEMENT POSITIONS | | • DESIGNATION OF 9 FIXED PATTERNS AND ARBITRARY POSITION |
| 6 | ANNOTATION | | |
| 7 | VARIABLE ITEMS | | |
| 8 | PAGE DIVISION | | |

INFORMATION PROCESSING APPARATUS HAVING FONT-INFORMATION EMBEDDING FUNCTION, INFORMATION PROCESSING METHOD THEREFOR, AND PROGRAM AND STORAGE MEDIUM USED THEREWITH

BACKGROUND OF THE INVENTION

1. Field of the Invention

The present invention relates to a mechanism for embedding font information.

2. Description of the Related Art

A technology that generates a portable document format (PDF) file and embeds font information in the file is known. According to this technology, a user is provided with a choice to globally embed selected fonts in the file. This approach is useful when the user is not aware whether a selected output terminal (i.e., printer) supports the particular fonts the user wishes to use. By globally embedding the fonts, regardless of whether the printer itself supports them, the user ensures that the desired fonts appear in the outputted document. However, by globally embedding all fonts, even those that may be supported by the printer, results in an increase in the size of the file, and the time required to process the file for printing.

There is another known system which includes an information processing apparatus, such as a personal computer, connected to a printer, in which, before the information processing apparatus generates print data to be transmitted to the printer, the information processing apparatus temporarily stores an electronic document (in so-called "intermediate code") having a data format different from that of the print data, which is to be finally transmitted to the printer, and, based on this electronic document, print data to be finally transmitted to the printer is re-generated and transmitted.

By embedding the above font information, which includes glyphs, in the electronic document in intermediate code, it is expected that the reproducibility of a printout based on the electronic document can be further improved. The above technology is disclosed in, for example, Japanese Patent Laid-Open Nos. 2002-334059 and 2002-330274. However, this approach is seen to increase the processing time for transmitting print data to the printer.

In still yet another known system, font information is automatically identified and automatically embedded in a form. A drawback to this approach is that, depending on the circumstances, fonts that a user may not want embedded will be embedded anyway.

While the above approaches provide a user the ability to embed font information, they result in among other things, an increase in file size, an increase in processing time, and embedding of unnecessary fonts. What is needed is a simple approach that allows a user to determine on a case-by-case basis whether font information is to be embedded.

SUMMARY OF THE INVENTION

The present invention realizes embedding font information with high usability.

According to a first aspect of the present invention, in an information processing apparatus that can edit an electronic document in which font information can be embedded, a controller unit is included that, based on editing implemented on the electronic document, queries whether or font information is to be embedded. This makes it possible to appropriately query, based on reflection of editing in the electronic document, whether or not the font information is to be embedded.

Further features of the present invention will become apparent from the following description of exemplary embodiments (with reference to the attached drawings).

BRIEF DESCRIPTION OF THE DRAWINGS

FIGS. 4A and 4B show a table showing a list of book attributes.

FIG. 5 is a table showing a list of chapter attributes.

FIG. 6 is a table showing a list of page attributes.

DESCRIPTION OF THE EMBODIMENTS

An exemplary embodiment of the present invention will now be described with reference to the drawings. It should be noted that the relative arrangement of the components, the numerical expressions and numerical values set forth in these embodiments do not limit the scope of the present invention.

First Embodiment

Outline of System

First, an outline of a document processing system according to a first embodiment of the present invention is described below with reference to FIGS. 1 to 12.

The document processing system includes an electronic original writer that converts a data file generated by a general application into an electronic original file, and a binding application that provides a function of editing the electronic original file. The document processing system enables generation and editing of a document formed by putting together generated data, and improves their operability to enable efficient document editing.

System Configuration and Operation

Figure 1:
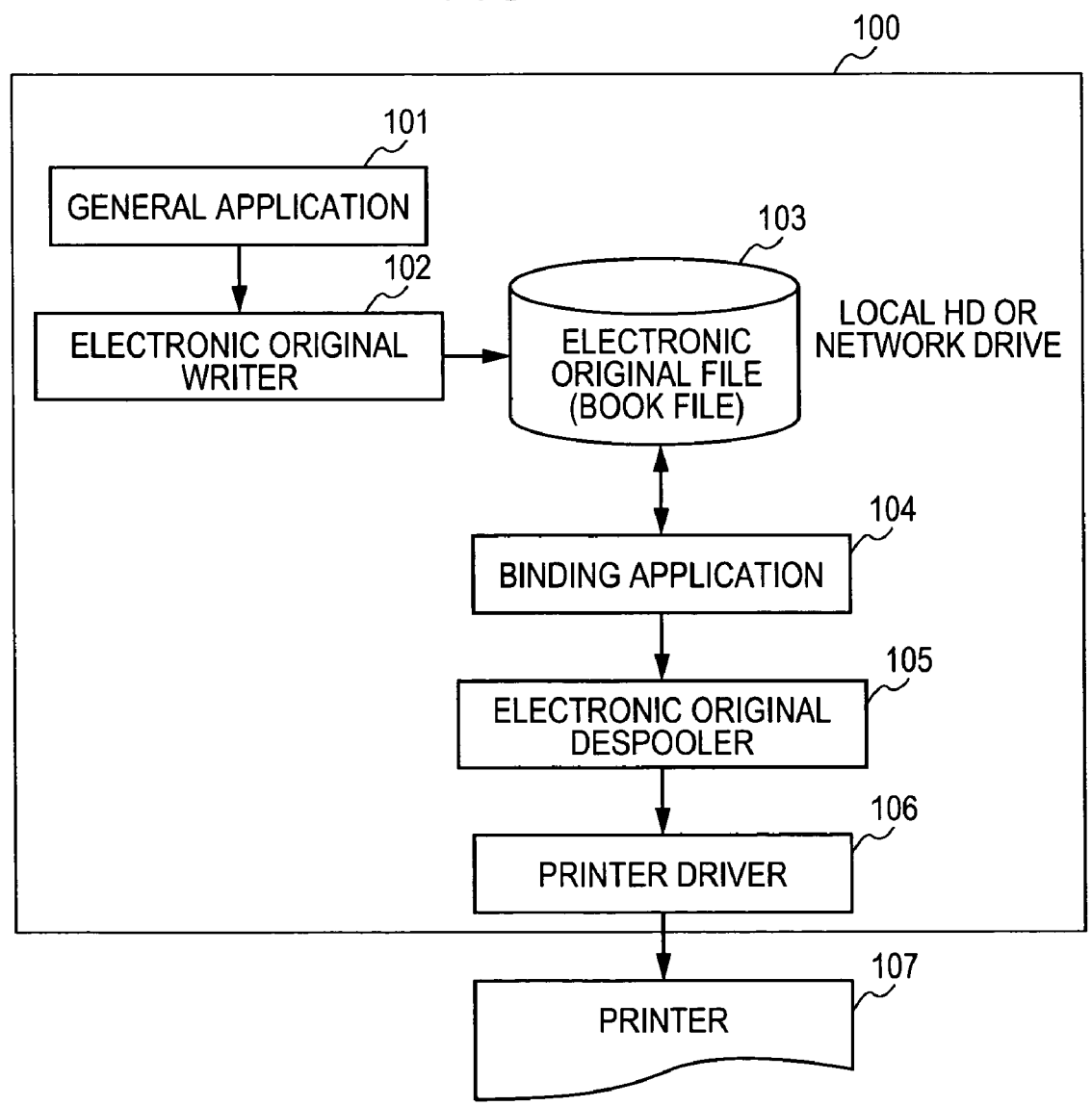
FIG. 1 is a block diagram showing an example of the configuration of software in a stand-along document processing system according to an embodiment of the present invention.

FIG. 1 shows the software configuration of the document processing system according to the first embodiment. The document processing system is realized by a digital computer (hereinafter also referred to as a "host computer") 100. The general application 101 shown in FIG. 1 is one of application programs that provide functions such as word processing, a spread sheet, photo retouching, drawings, painting, presentation, and text editing, and has a printing function for an operating system (OS). When these application programs print application data such as generated document data and image data, they use a predetermined interface, commonly called a "graphical device interface" (GDI) provided by the OS. In other words, in order to print generated data, the application 101 transmits a predetermined OS-dependent-format output command (called a "GDI function") to an output module that provides the above interface. After receiving the output command, the output module converts the output command to have a format that can be processed by an output device, such as a printer, and outputs the converted command (called the "device driver interface (DDI) function"). The format that can be processed by the output device differs depending on the type, manufacturer, model, etc., of the device. Thus, a device driver is provided for each device, and the OS generates a print job by using the device driver to perform command conversion, generating print data, and applying a job language (JL) to the print data. When Microsoft® Windows is used as the OS, a module that is called a "GDI" corresponds to the above output module.

An electronic original writer 102 is a module obtained by improving the above device driver and is a software module provided for realizing the document processing system. However, the electronic original writer 102 is not intended for a specified output device. The electronic original writer 102 converts an output command into a format that can be processed by a binding application 104 and a printer driver 106, whose details are described later. A format (hereinafter referred to as an "electronic original format") obtained by conversion in the electronic original writer 102 is particularly indifferent if a page-unit manuscript can be expressed in details of the format. Among substantial standard formats, for example, the PDF format and Scalable Vector Graphics (SVG) format of Adobe® Systems can be employed as electronic original formats.

When the electronic original writer 102 is used by the application 101, the electronic original writer 102 is designated as a device driver for use in output before printing is executed. An electronic original file in a state in which it is generated by the electronic original writer 102 bears no complete electronic original-file format. Accordingly, it is the binding application 104 that designates the electronic original writer 102 as a device driver. Under the control of the binding application 104, conversion of application data into an electronic original file is executed. The binding application 104 completes, as an electronic original file having a format (described later), a new incomplete electronic original file generated by the electronic original writer 102. A file generated by the electronic original writer 102 is called an "electronic original file", and an electronic original file whose structure is given by the binding application 104 is called a "book file". When it is not necessary to particularly distinguish between files, any of a document file, an electronic original file, and a book file is called a "document file or document data".

As described above, by designating the electronic original writer 102 as a device driver, and using the application 101 to print data, application data is converted into an electronic original format in which a page (hereinafter referred to as a "logical page" or "manuscript page") defined by the application 101 is used as a unit, and is stored as an electronic original file 103 in a storage medium such as a hard disk. The hard disk may be a local drive included in a computer that realizes the document processing system according to the first embodiment. Alternatively, when the document processing system is connected to a network, the hard disk may be a drive provided on the network.

The binding application 104 provides a user with a function of reading the electronic original file (or the book file) 103 and editing the read file. The binding application 104 however, does not provide a function of editing the content of each page, but does provide a function of editing the structure of a chapter or book in which a page is used as the smallest unit.

When the electronic original file 103 edited by the binding application 104 is printed, an electronic original despooler 105 is activated by the binding application 104. The electronic original despooler 105 is a program module installed in the computer with the biding application 104, and is used to output image-forming data to a printer driver 106 when a document (book file) that the binding application 104 uses is printed. The input/output interface of the electronic original despooler 105 reads a designated book file from the hard disk, and generates and outputs, to an output module (not shown), an output command that matches the output module of the OS in order to print each page in format described in the book file. At this time, the printer driver 106 for the printer 107 (output device) is designated as a device driver. The output module converts the received output command into a device command, and outputs the device command to the printer driver 106. The printer driver 106 converts the device command into a command in a page description language that can be interpreted for execution by the printer 107. The converted command is transmitted from the printer driver 106 to the printer 107, and the printer 107 prints an image complying with the command.

Figure 2:
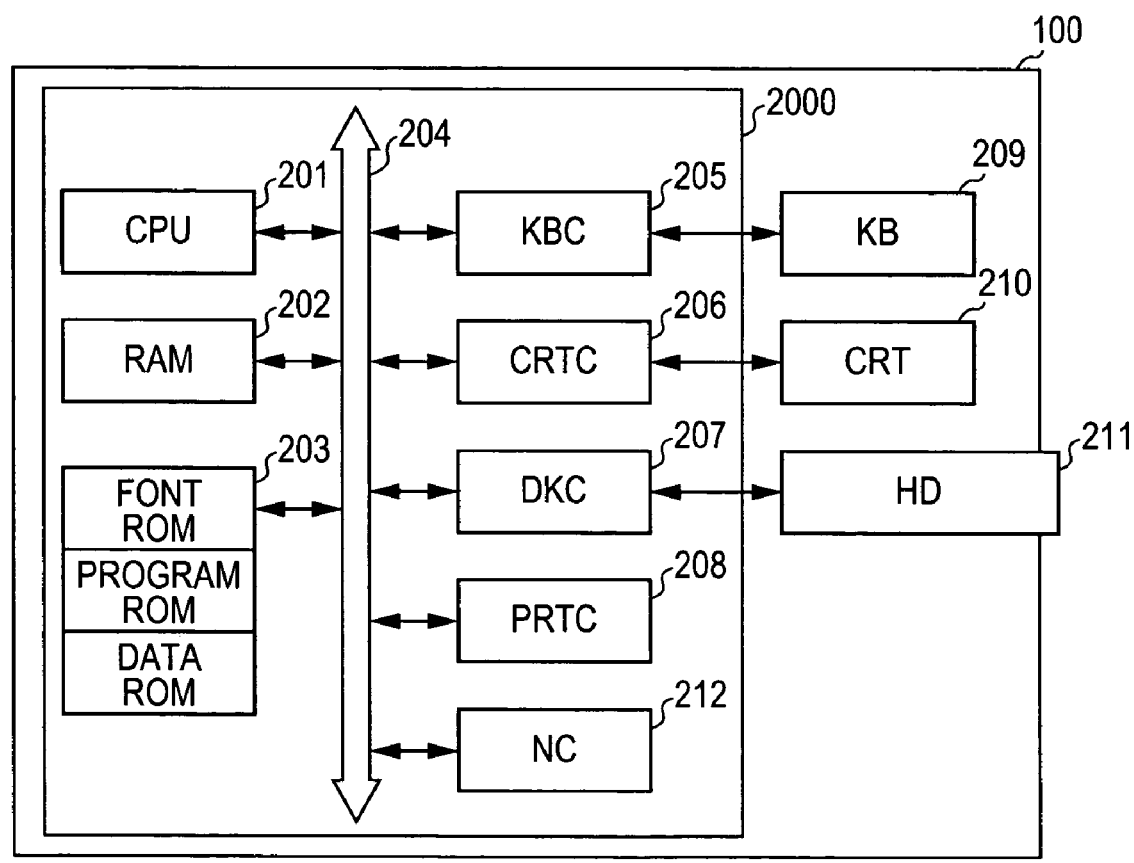
FIG. 2 is a block diagram showing an example of the configuration of hardware for realizing the document processing system according to the embodiment.

FIG. 2 is a block diagram showing the hardware of the computer 100. Referring to FIG. 2, a central processing unit (CPU) 201 realizes the software configuration shown in FIG. 1 and processes shown in flowcharts described below by executing an OS that is stored in a program read-only memory (ROM) of a ROM 203 or is loaded from a hard disk 211 to a random access memory (RAM) 202, and a program such as a general application or binding application. The RAM 202 functions as a main memory, a work area, etc., for the CPU 201. A keyboard controller (KBC) 205 controls input from a keyboard 209 and a pointing device (not shown). A cathode-ray tube controller (CRTC) 206 controls display of a CRT display 210. A disk controller (DKC) 207 controls accessing of a hard disk (HD) 211 that stores a boot program, various applications, font data, user files, editing files, etc., and of a floppy disk (not shown). A printer controller (PRTC) 208 controls signal exchange with the printer 107 in the connected state. A network controller (NC) 212 executes processing for communicating with other network-connected devices.

Format of Electronic Original Data

Before details of the binding application 104 are described, the data format of the book file is described below.

The book file has a three-layer structure imitating a paper book. Its top layer is called a "book" imitating a book, and defines attributes concerning the entirety of the book. Its intermediate layer below the top layer corresponds to chapters of a book, and as such is called "chapters". The intermediate layer can define attributes for each chapter. Its bottom layer is called "pages" and corresponds to each page defined in an application program. For the pages, attributes for each page can be defined in the bottom layer. In addition, one book may include a plurality of chapters, and one chapter may include a plurality of pages.

Figure 3A:
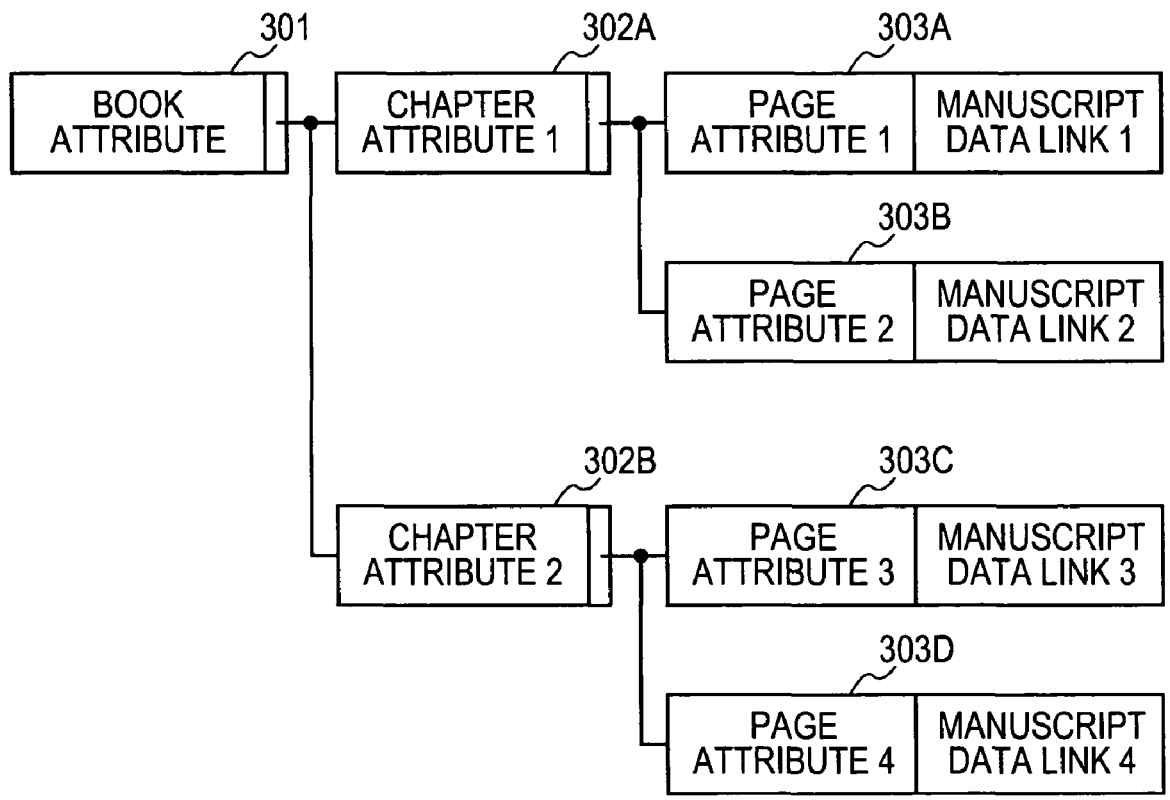
FIGS. 3A and 3B are illustrations showing an example of the structure of a book file.
Figure 3B:
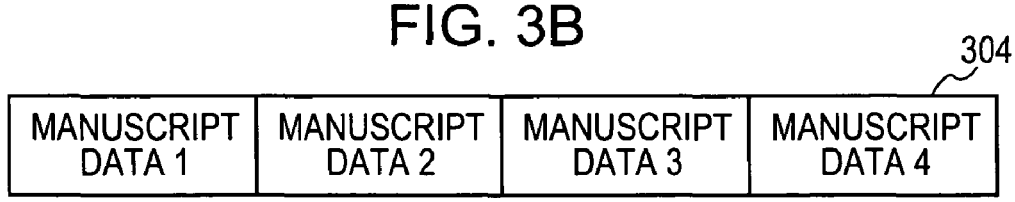

FIG. 3A schematically shows an example of a book file format. As shown in FIG. 3A, a book, chapters, and pages in the book file are indicated by corresponding nodes. One book file includes one book. The book and chapters are concepts for defining a structure for a book. Thus, they include, as the entities thereof, defined attribute values and links to the bottom layer. The page has, as the entity thereof, data of each page output by the application program. Accordingly, the page includes the entities of manuscript pages and links to manuscript page data items in addition to the attribute values.

In addition, a print page for use in outputting to paper or the like may include a plurality of manuscript pages. This structure is not displayed by links, and is displayed as attributes in the layers of the book, chapters, and pages.

In FIG. 3A, book 301 defines book attributes and is linked to two chapters 302A and 302B. This linkage indicates that chapters 302A and 302B are included in book 301. Chapter 302A is linked to pages 303A and 303B, and it is indicated that pages 303A and 303B are included in chapter 302A. In pages 303A and 303B, attribute values are defined, and links to manuscript data items that are the entities of pages 303A and 303B are included. These links indicate the manuscript data items 1 and 2 of manuscript data 304 shown in FIG. 3B, and indicate that the entities of pages 303A and 303B are manuscript data items 1 and 2.

FIGS. 4A and 4B show a list of book attributes. Regarding items that can be defined overlapping with those in the bottom layer, attribute values in the bottom layer are preferentially employed. Accordingly, regarding items included only in the book attributes, values defined in the book attributes are used as valid values in the entire book. However, items that overlap with those in the bottom layer have the meanings of predetermined values in the case in which the items are not defined. Each item shown does not correspond to one specific item but may include a plurality of related items.

FIG. 5 is a list of chapter attributes, and FIG. 6 is a list of page attributes. A relationship between the chapter attributes and the page attributes is similar to the relationship between the book attributes and bottom-layer attributes.

As shown in FIGS. 4 to 6, there are six items specific to the book attributes: a printing method, details of binding, top/back covers, index paper, slip paper, and chapter separation. These items are defined through the book. As a printing method attribute, three values that represent single-sided printing, two-sided printing, and binding printing, respectively, can be specified. In binding printing, by bundling sheets whose number is separately specified, half folding the bundled sheets, and combining the folded sheets, bookbinding can be performed. As an attribute of details of binding, an opening direction, the number of sheets to be bundled, etc., can be specified.

A top/back cover attribute includes, when an electronic original file complied as a book is printed, designation of adding sheets serving as top and back covers, and designation of print content to the added sheets. An index paper attribute includes designation of insertion as chapter separations of index sheets having tabs which are separately provided in a printer, and designation of print content to the tabs. This attribute becomes valid when a printer for use is provided with either an inserter for inserting, at a desired position, separately prepared paper, or a plurality of paper feeding cassettes. This also applies to a slip paper attribute.

The slip paper attribute includes designation of insertion of sheets fed as chapter separations from the inserter or a paper feeding cassette, and, when a slip paper is inserted, designation of a paper feeder.

A chapter separation attribute includes, when separating chapters, designation of whether to use new sheets, whether to use a new print page, or particularly performing nothing. When single-sided printing is performed, the use of new paper and the use of a new print page have the same meaning. When two-sided printing is performed, by designating the "use of new paper", consecutive chapters are not printed on paper. However, by designating the "use of a new print page", there is a possibility that consecutive chapters may be printed on two sides of a single sheet of paper.

Regarding the chapter attributes, no items are specific to each chapter, and all the attributes are identical to the book attributes. Therefore, if a definition of a chapter attribute differs from that of a book attribute, a value defined as the chapter attribute is preferentially used. There five items that are common only to the book attributes and the chapter attributes: a sheet size, a sheet direction, N-up printing designation, enlargement/reduction, and a sheet ejecting method. Among these items, the N-up printing designation is an item for specifying the number of manuscript pages included per print page. Arrangements that can be specified include 1×1, 1×2, 2×2, 3×3, and 4×4. The sheet ejecting method attribute is an item for specifying whether to staple ejected sheets. Its validity is dependent on whether a printer for use has a stapling function.

Items specific to the page attributes include a page rotation attribute, zooming, designation of arrangement, and page division. The page rotation attribute is an item for specifying an angle of rotation in the case of arranging manuscript pages on a print page. The zooming attribute is an item for specifying a manuscript page magnification. The magnification is specified by using the size of a virtual logical page region as 100%. The virtual logical page region is a region occupied by each manuscript page when manuscript pages are arranged in accordance with designation of N-up. For example, in the case of "1×1", the virtual logical page region corresponds to one print page. In the case of "1×2", the virtual logical page region corresponds to a region in which each side of one print page is reduced to approximately 70%.

Attributes that are common to the book, chapters, and pages are a watermark attribute and a header/footer attribute. A watermark includes a separately specified image and character string which are printed in a form overlaid on data generated by an application. A header is a watermark that is printed in a top margin of each page, and a footer is a watermark that is printed in a bottom margin of the page. The header and the footer have items that can be specified by variables such as a page number, and a date and time. Items that can be specified in the watermark attribute and the header/footer attribute are common to those in the chapters and pages, but differ from those in the book. In the book, the contents of the watermark and the header and footer can be set. In addition, through the entirety of the book, it can be specified how the watermark and the header and footer are printed. In addition, in each chapter or page, it can be specified whether to print, in the chapter or page, a watermark, header, and footer set in the book.

Book File Generating Process

The book file has the above-described structure and contents. Next, a book file generating process of the binding application 104 and the electronic original writer 102 is described. The book file generating process is realized as a part of editing operation on the book file by the binding application 104.

Figure 7:
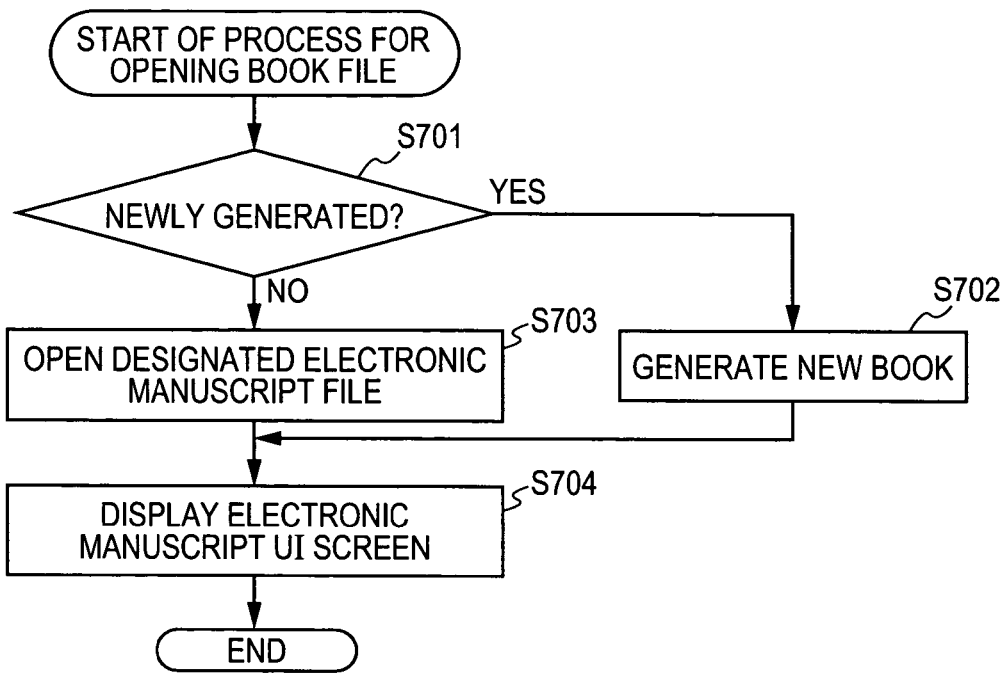
FIG. 7 is a flowchart showing a book file opening process.
Figure 11:
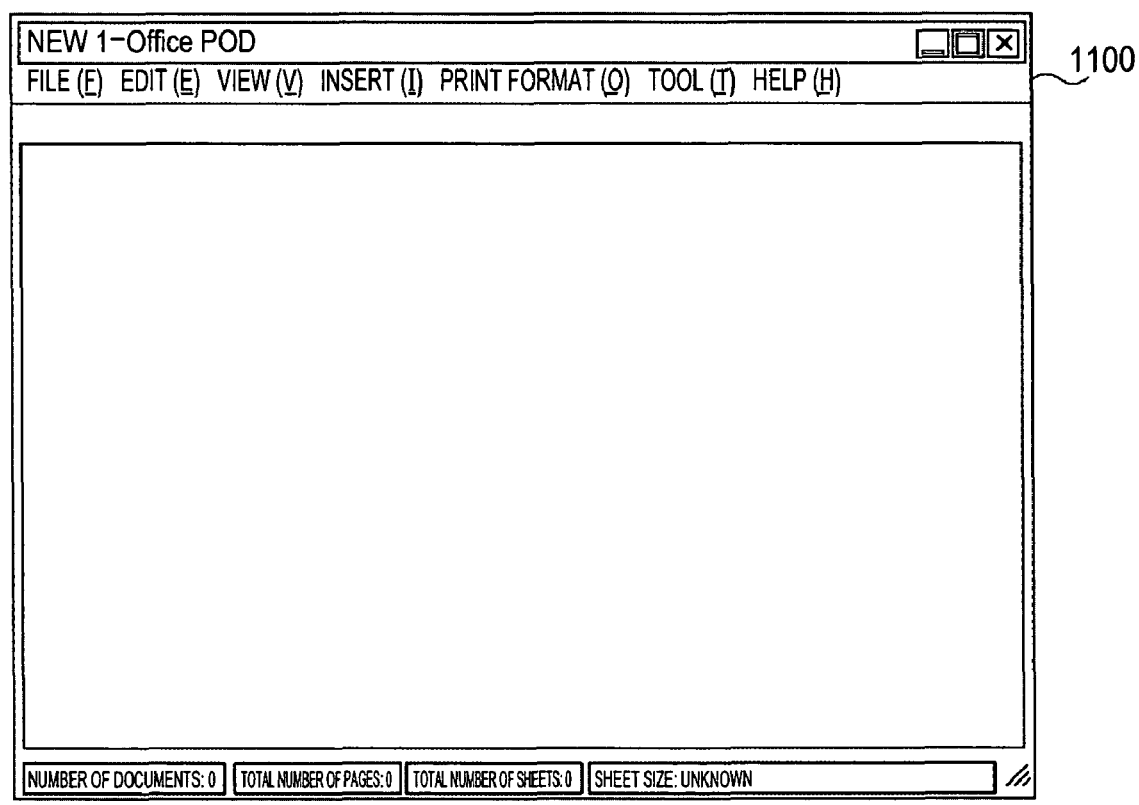
FIG. 11 is an illustration of an example of a UI displayed when a new book file is generated.

FIG. 7 shows a process in which the binding application 104 opens a book file. First, in step S701, it is determined whether a book file that needs to be opened is to be newly generated, or in other words, it is determined whether there are generated book files. If, in step S701, it is determined that the book file is to be newly generated, then in step S702, a new book file including no chapter is generated. The new book file has the book 301 as a node in the example of FIG. 3A, and serves as a node of a book having no links to chapter nodes. Regarding the book attribute, a set of attributes provided beforehand for new generating is used. Next, in step S704, a user interface (UI) screen for editing the new book file is displayed. FIG. 11 shows an example of a UI screen 1100 displayed when a new book file is generated. Since, in this case, the book file has no substantial content, nothing is displayed on the UI screen 1100.

Figure 10:
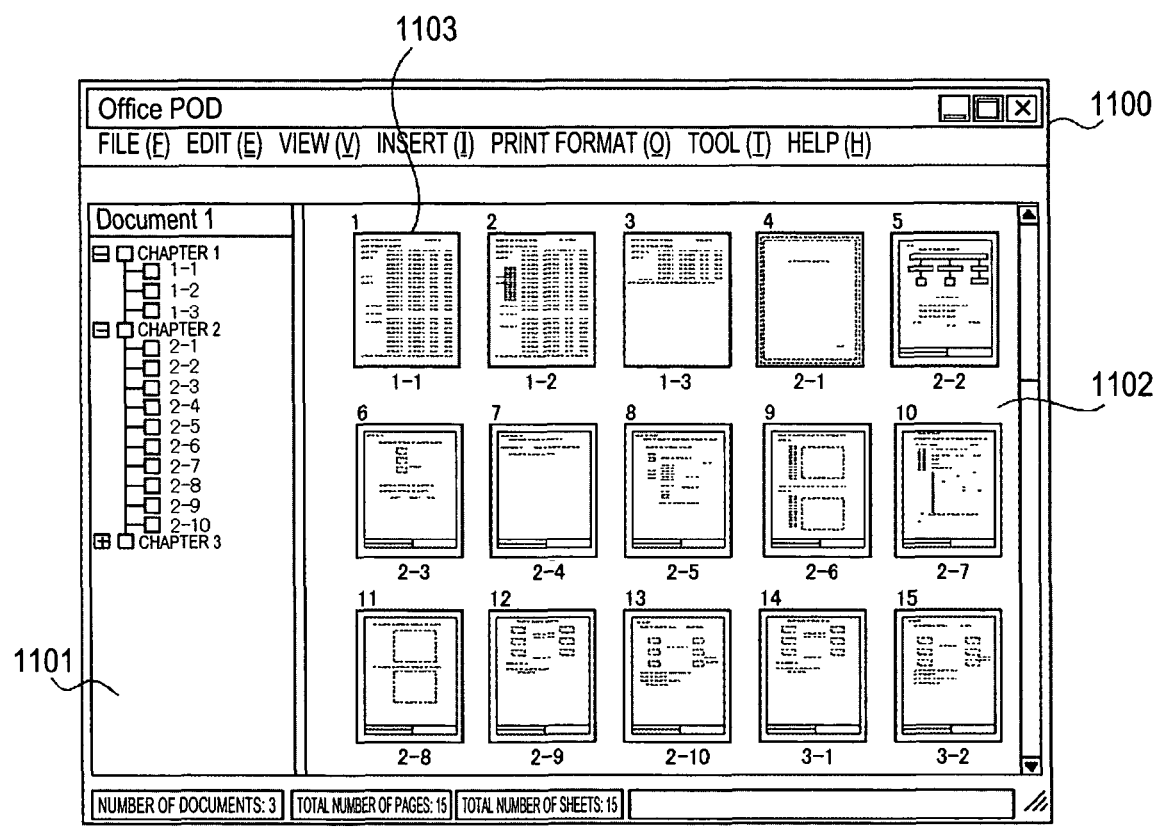
FIG. 10 is an illustration of an example of a user interface (UI) for a binding application.

Alternatively, if, in step S701, it is determined that there are the generated book files, then in step S703, a specified book file is opened and the UI screen is displayed in accordance with the structure, attributes, contents of the book file. FIG. 10 shows an example of the UI screen 1100, which displays the specified book file among the generated book files. The UI screen 1100 includes a tree portion 1101 indicating the structure of the book and a preview portion 1102 indicating pages in a printed state. In the tree portion 1101, chapters included in the book and pages included in each chapter are displayed in tree structure as shown in FIG. 3A. The pages displayed in the tree portion 1101 are manuscript pages. The preview portion 1102 displays the contents of print pages in reduced form. The order of displaying the contents reflects the structure of the book.

Application data converted into electronic original file form by the electronic original writer 102 can be added as a new chapter to the opened file. This function is called the "electronic original import function". By using the process shown in FIG. 7 to perform electronic original import on the new book file generated, the entity of the book file is formed. This function is activated by dragging and dropping application data on the screen shown in FIG. 10.

Figure 8:
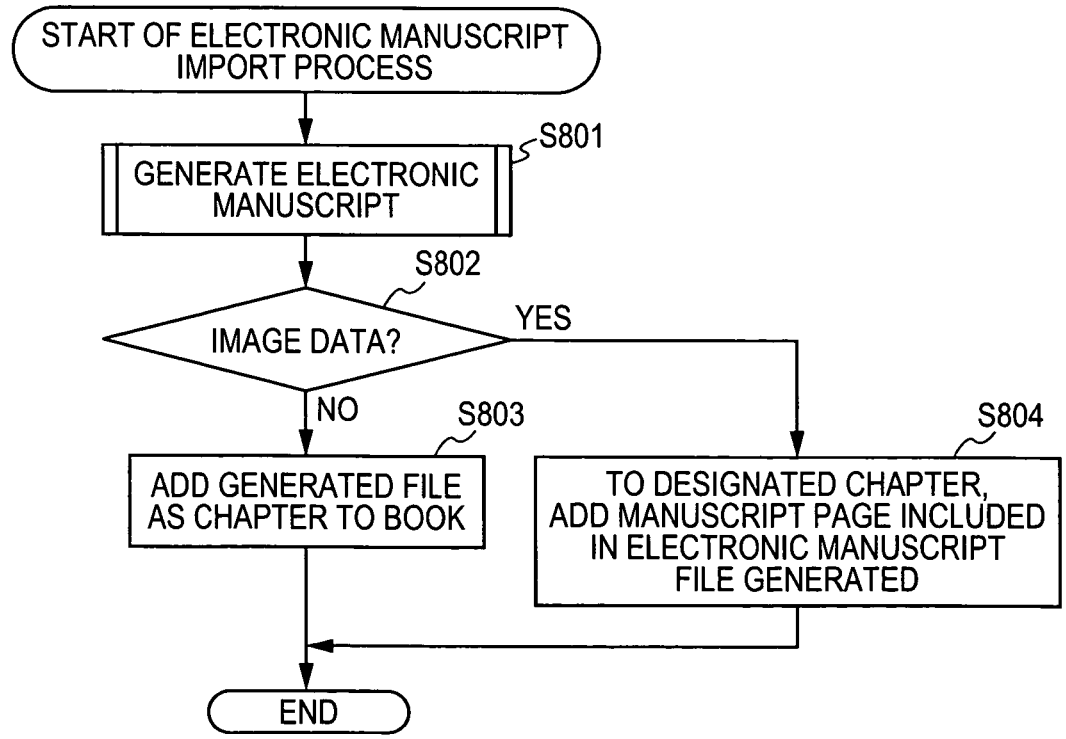
FIG. 8 is a flowchart showing a process for importing an electronic document to a book file.

FIG. 8 shows an electronic original import process. In step S801, by activating an application program that generates designated application data, designating the electronic original writer 102 as a device driver, and printing out application data, conversion into electronic original data is performed. After the conversion finishes, in step S802, it is determined whether the converted data is image data. This determination is performed based on a file extension of the application data if it is performed under a Microsoft® Windows OS. For example, if the extension of application data is "bmp", it is determined that the data is bitmap data. If the extension of application data is "jpg", it is determined that the data is JPEG (Joint Photographic Experts Group) image data. If the extension of application data is "tff", it is determined that the data is TIFF (tagged image file format) image data. In the case of such types (i.e., bmp, jpg, tff) of image data, an electronic original file can be generated from image data without activating the application as in step S801. Thus, step S801 can be omitted.

If, in step S802, it is determined that the converted data is not image data, then in step S803, the electronic original file generated in step S801 is added as a new chapter to the book of the presently opened book file. Regarding chapter attributes that are common to book attributes, the values of the book attributes are copied. Regarding chapter attributes that are not common, predetermined values provided beforehand are set as the chapter attributes.

If, in step S802, it is determined that the converted data is image data, then in step S804, a new chapter is not added, and each manuscript page included in the electronic original file generated in step S801 is added to the specified chapter. However, if the book file is a newly generated file, a new chapter is generated and each page of the electronic original file is added as each page belonging to the chapter. For page attributes that are common to attributes in the top layer, the values of the attributes are given. Regarding attributes defined in application data that are inherited by the electronic original file, their values are given. When, for example, N-up designation or the like is specified in application data, its attribute value is inherited. As described above, a new book file is generated or a new chapter is added.

Figure 9:
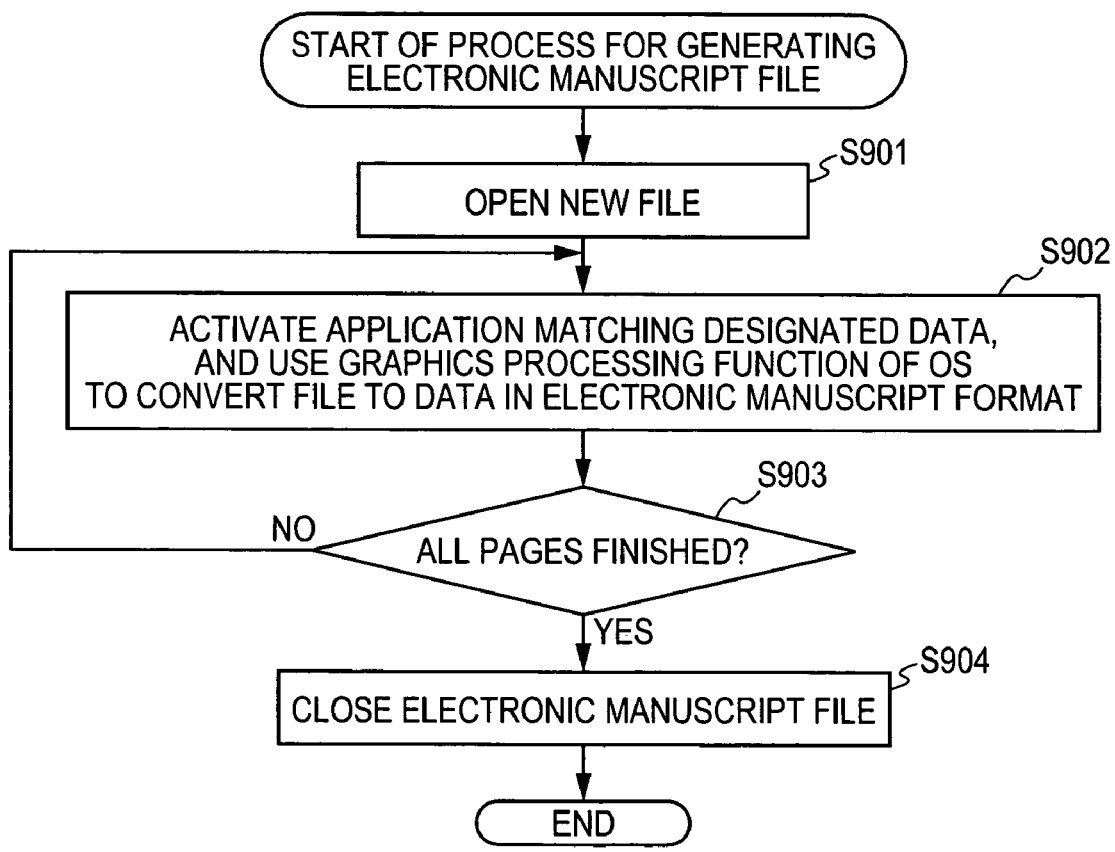
FIG. 9 is a flowchart showing an example of a process for converting application data in step S801 in FIG. 8 into an electronic document.

FIG. 9 is a flowchart showing step S801 in FIG. 8 in which the electronic original file is generated by the electronic original writer 102. In step S901, a new electronic original file is generated and opened. By activating an application matching designated application data, the electronic original writer 102 is used as a device driver to transmit an output command to an output module of the OS. In step S902, the output module uses the electronic original writer 102 to convert the received output command into electronic original format data, and outputs the data. A receiver that receives the output data is the electronic original file opened in step S901. In step S903, it is determined whether conversion on all designated data has finished. If the conversion has finished, then in step S904, the electronic original file is closed. The electronic original file generated by the electronic original writer 102 is a file including the entity of the manuscript data shown in FIG. 3B.

Editing of Book File

As described above, a book file can be generated from application data. For the generated book file, the following types of editing operation on chapters and pages are possible: (1) newly adding; (2) deletion; (3) copy; (4) cutout; (5) pasting; (6) movement; (7) chapter name change; (8) page re-number; (9) top cover insertion; (10) slip paper insertion; (11) index paper insertion; and (12) layout of each manuscript page.

In addition, an operation that cancels editing operation once it has been done, and an operation that retries canceled operation can be performed. These editing functions enable, for example, types of editing operation such as integration of a plurality of book files, re-arrangement of chapters and pages in a book file, deletion of chapters and pages in a book file, change of manuscript page layout, and insertion of slip paper and index paper. By performing these types of editing operation, the results of the operation are reflected in the attributes shown in FIGS. 4A, 4B, and 5, or are reflected in book file structure. For example, by newly adding a blank page, the blank page is inserted at a designated position. This blank page is treated as a manuscript page. In addition, by changing manuscript pages layout, the changes are reflected in attributes such as a printing method, N-up printing, top/back cover, index paper, slip paper, and chapter separation.

Output of Book File

The book file generated and edited as described above are intended for printout. By selecting a file menu from the UI screen 1100 (for the binding application 104) in FIG. 10 and selecting printing therefrom by a user, the book file is printed out by a specified output device. In this case, the binding application 104 generates a job ticket from the presently opened book file, and passes the job ticket to the electronic original despooler 105. The electronic original despooler 105 converts the job ticket into an output command of the OS, for example, a graphical device interface (GDI) function, and transmits the GDI function to an output module. The output module uses the specified printer driver 106 to generate a command matching a device and transmits the command to the device.

The job ticket is data having a structure in which a manuscript page is used as the smallest unit. The structure of the job ticket defines the layout of manuscript pages on paper. For one job, one job ticket is issued. Accordingly, it has a node called a "document" at its top level. The node defines an attribute concerning document entirety, for example, two-sided printing or single-sided printing. Paper nodes belong to a level below the top level, and include attributes such as the identifier of sheets for use and designation of a paper feeder in the printer 107. For each paper node, nodes of sheets of the paper for printing belong to the paper node. One sheet corresponds to one piece of paper. Print (physical) pages belong to each sheet. In single-sided printing, one physical page belongs to one sheet. In two-sided printing, two physical pages belong to one sheet. Manuscript pages that are arranged on each physical page belong to the physical page.

The electronic original despooler 105 converts the above job ticket into an output command for the output module.

Other System Configurations

An outline of the document processing system according to this embodiment has been described above. Although the document processing system is of a stand-alone type, even in a server-client system formed by expanding this stand-alone system, a book file can be generated and edited in a substantially similar configuration and process. However, the book file and printing are managed by a server.

Figure 12:
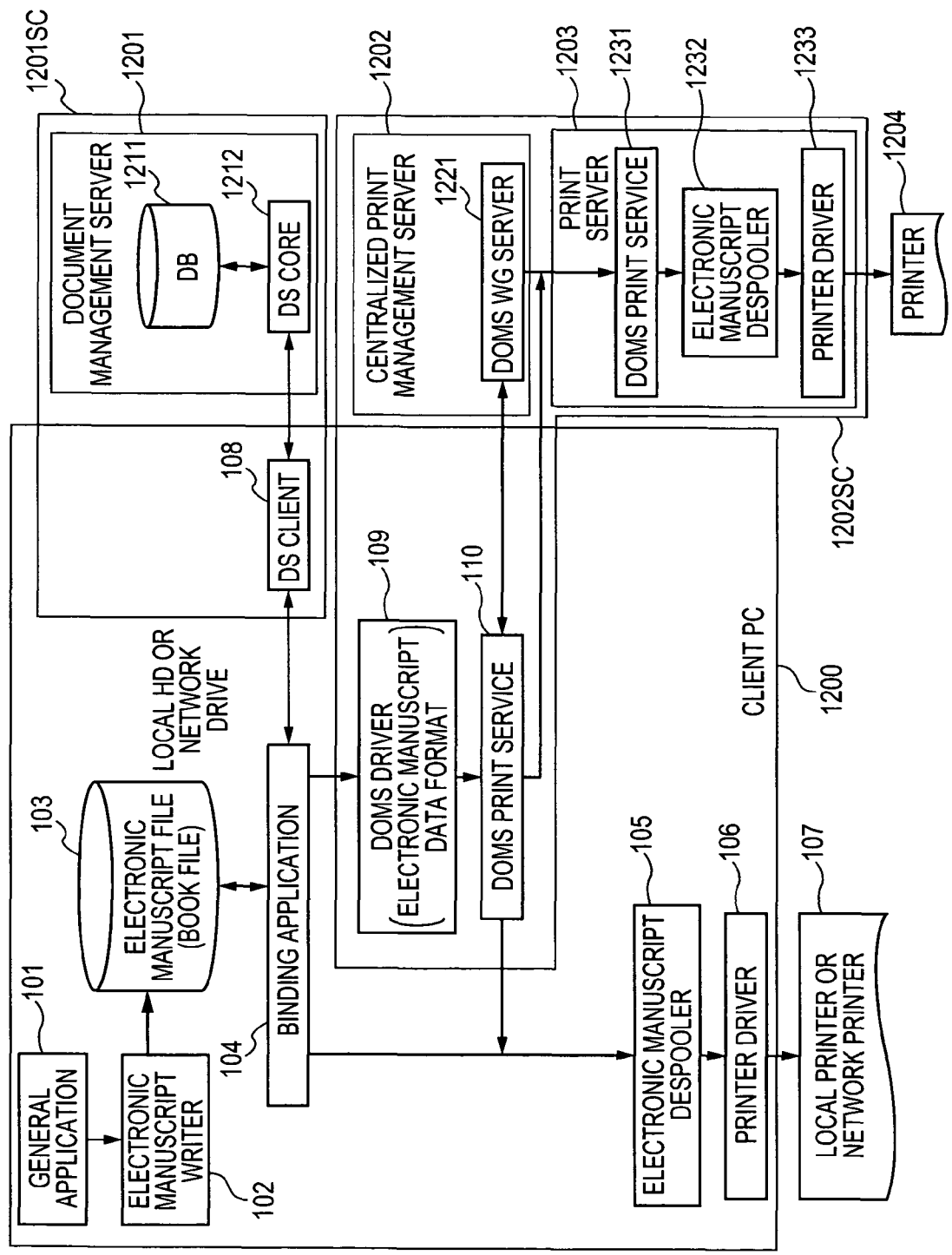
FIG. 12 is a block diagram showing an example of the configuration of software in a client-server document processing system.

FIG. 12 is a block diagram showing the configuration of a server-client document processing system. A client document processing system 1200 has a configuration in which a document output management service (DOMS) driver 109, a DOMS print service module 110, and a document service (DS) client module 108, which are client modules, are added to a stand-alone system. The client document processing system 1200 connects to a document management server 1201, a centralized print management server 1202, and a print server 1203. Although these servers are connected to the client document processing system 1200 by a normal network, when they simultaneously function as clients, they are connected by interprocess communication that simulates internetwork communication.

In the example shown in FIG. 12, both the document management server 1201 and the centralized print management server 1202 are connected to the client document processing system 1200. Either one of both servers may exist on the network. For example, if the document management server 1201 is connected, a document-management server-client system 1201SC including a document service client module 108 of the server 1201 is added to the stand-alone document management system. If the centralized print management server 1202 is connected, a printing-management server-client system 1202SC including a client module (DOMS print service module 110) of the server 1202 is added to the stand-alone document management system.

The document management server 1201 stores the book file generated and edited by the binding application 104. When the centralized print management server 1202 is used to manage the book file, the book file is stored in a database 1211 in the document management server 1201 instead of a local hard disk (HD) in the client document processing system 1200 as a client personal computer (PC), or in addition to the local HD. Storing and reading of the book file between the binding application 104 and the document management server 1201 are performed by the DS client 108 and a DS core 1212.

The centralized print management server 1202 manages printing of a book file stored in the client document processing system 1200, or stored in the document management server 1201. A printing request of the client is transmitted to a DOMS WG server module 1221 in the centralized print management server 1202 through a DOMS print service module 110. When printing is performed by using a printer of the client, the centralized print management server 1202 passes electronic original data to the electronic original despooler 105 through the DOMS print service module 110 of the client. When printing is performed by using the print server 1203, the centralized print management server 1202 transmits the electronic original data to the print server 1203, which after processing by the print server 1203 is printed on printer 1204. The centralized print management server 1202 performs security checking concerning qualification of a user who issues a printing request for the stored book file, and stores a printing log. As described above, the document processing system can be realized both in stand-alone form and in client-server-system form. Reference numerals 1231 (DOMS print service), 1232 (electronic manuscript despooler), and 1233 (printer driver) of the print server 1203 perform the same functionality as reference numerals 110, 105, and 106 described above.

Details of Preview

As described above, by using the binding application 104 to open the book file, the UI screen 1100 shown in FIG. 10 is displayed. In the tree portion 1101, a tree indicating the structure of the opened book (hereinafter referred to as the "book of interest") is displayed. In the preview portion 1102, three display modes in accordance with use's designation are prepared. One mode is called a "manuscript view mode" which directly displays manuscript pages. In this manuscript view mode, manuscript pages belonging to the book of interest are displayed in reduced form. No layout is reflected in the pages displayed in the preview portion 1102. A second mode is called a "printing view mode". In this printing view mode, the manuscript pages are displayed in a form in which manuscript layout is reflected. The third mode is called a "simplified printing view mode". In this simplified printing view mode, the contents of the manuscript pages are not reflected in the pages displayed in the preview portion 1102, and only layout of the pages is reflected.

Stapling Control

Stapling control, which is performed by the binding application 104 in the computer 100, which connects to a printer having a stapling function, will now be described.

Figure 13:
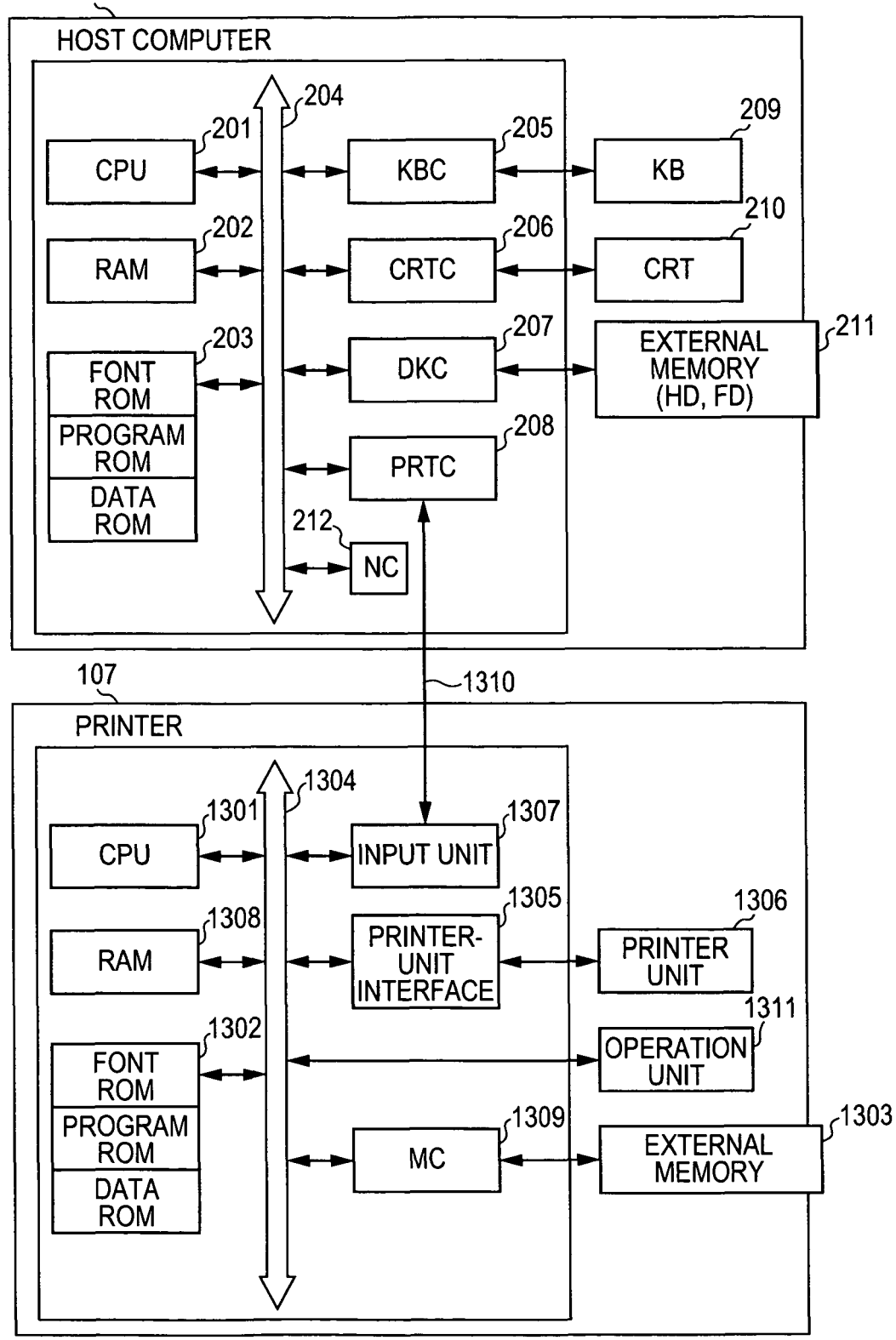
FIG. 13 is a block diagram showing an example of the configuration of a stapling control system.

FIG. 13 is a block diagram showing the configuration of a stapling control system. As shown in FIG. 13, the stapling control system includes the (host) computer 100 and printer 107 shown in FIG. 2, which has a stapling function.

The configuration of the printer 107 is described below. The present invention can be applied to even a single apparatus, even a system including a plurality of apparatuses, and even a system in which connection is established by using networks, such as a local area network (LAN) and a wide area network (WAN), for performing processing, if functions of the present invention are realized.

As shown in FIG. 13, in the printer 107, based on a control program or the like stored in a program ROM in a ROM 1302 and a control program or the like stored in an external memory 1303, a printer CPU 1301 outputs an image signal as output information to a printer unit 1306 (printer engine) by using a printer interface (I/F) 1305 connected to a system bus 1304. The program ROM in the ROM 1302 stores a control program for the CPU 1301, etc. A font ROM in the ROM 1302 stores font data for use in generating output information, etc. A data ROM in the ROM 1302 stores information for use in the computer 100, etc., when the printer 107 does not include the external memory 1303 such as a hard disk.

The CPU 1301 can communicate with the computer 100 through an input unit 1307 and can report, to the computer 100, information in the printer 107, etc. A RAM 1308 functions as a main memory for the CPU 1301 and as a work area or the like, and its storage size can be expanded by an option RAM connected to an add-in port (not shown).

The RAM 1308 is used as an output information loading area, an environmental data storage area, and a nonvolatile RAM. Accessing of the above hard disk and the external memory 1303 such as an IC card is controlled by a memory controller (MC) 1309. The external memory 1303 is connected as an option, and stores font data, emulation programs, form data, etc. An operation panel 1311 has switches for operation, light-emitting-diode indicators, etc.

The number of external memories 1303 is not limited to one but may be plural. As the external memory 1303, external memories that store a resident font, option cards, programs for interpreting printer control languages having different language systems may be connected. Furthermore, the printer 107 may include an NVRAM (not shown) and may store printer-mode setting information from the operation panel 1311.

Book File Editing Function

A manuscript editor that edits a document and image in the book file generated by the binding application 104 is provided. The manuscript editor can be activated by the binding application 104, and the book file can be edited for each logical page.

Figure 15:
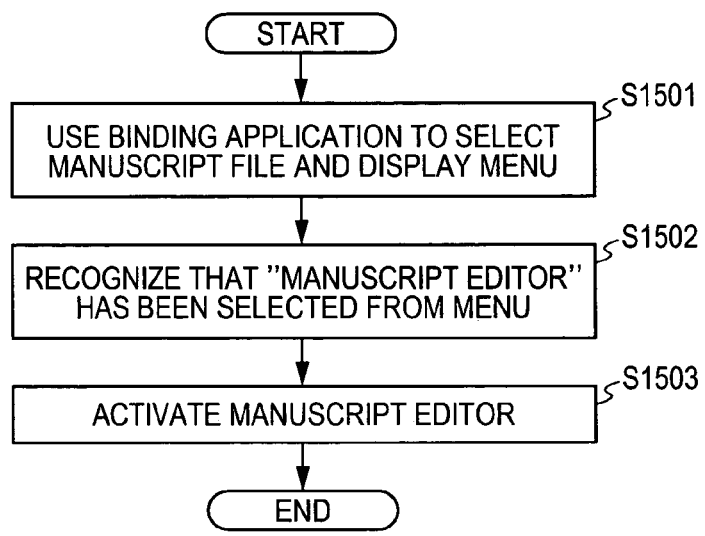
FIG. 15 is a flowchart showing an example of a manuscript editor activating process.

FIG. 15 is a flowchart showing an editing process. In step S1501, for a selected manuscript file, a menu is displayed. In step S1502, through the menu as an operation unit, it is recognized that the manuscript editor has been selected. In step S1503, by activating the manuscript editor, a main screen is displayed.

Figure 14:
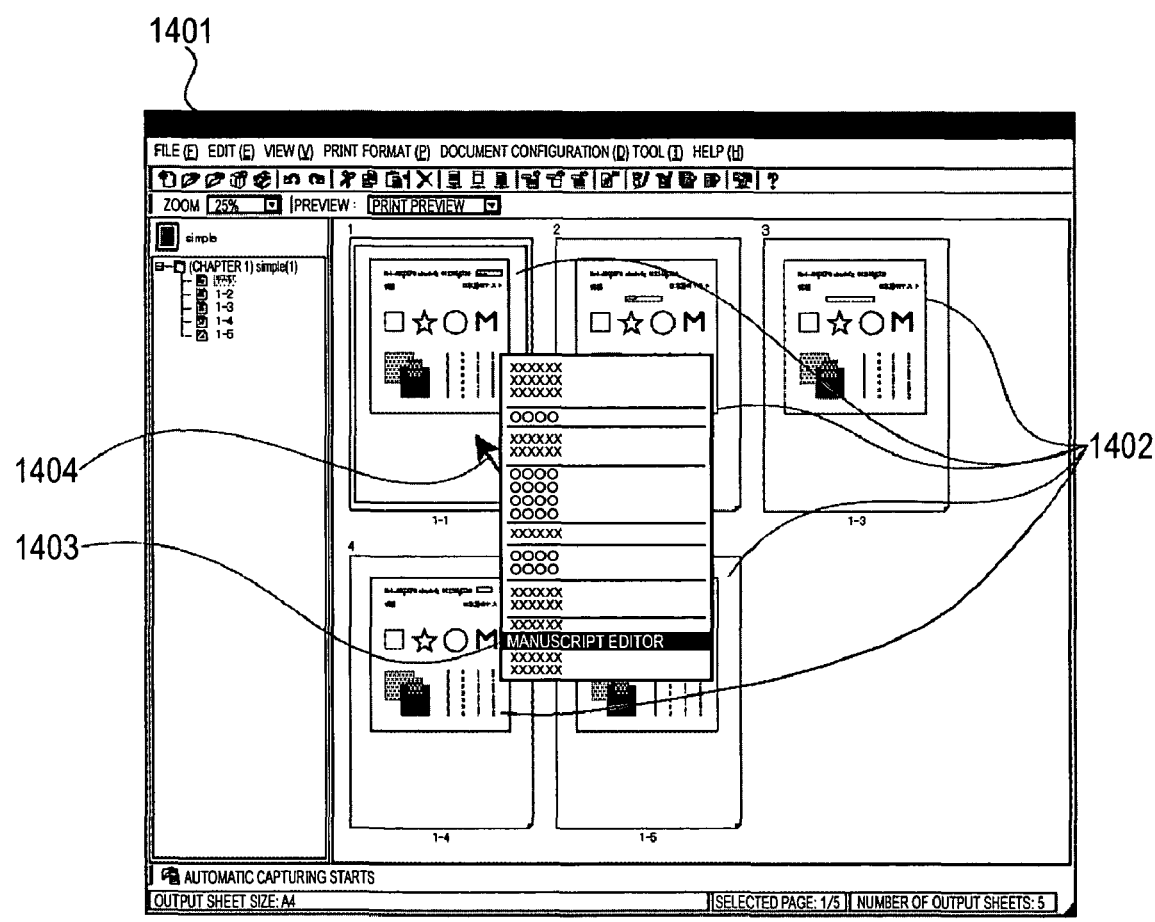
FIG. 14 is an illustration of a UI screen displaying an example of activation of a manuscript editor in an embodiment of the present invention.

FIG. 14 shows an example of a UI that is operated by the user when the manuscript editor is activated by the binding application 104.

Figure 16:
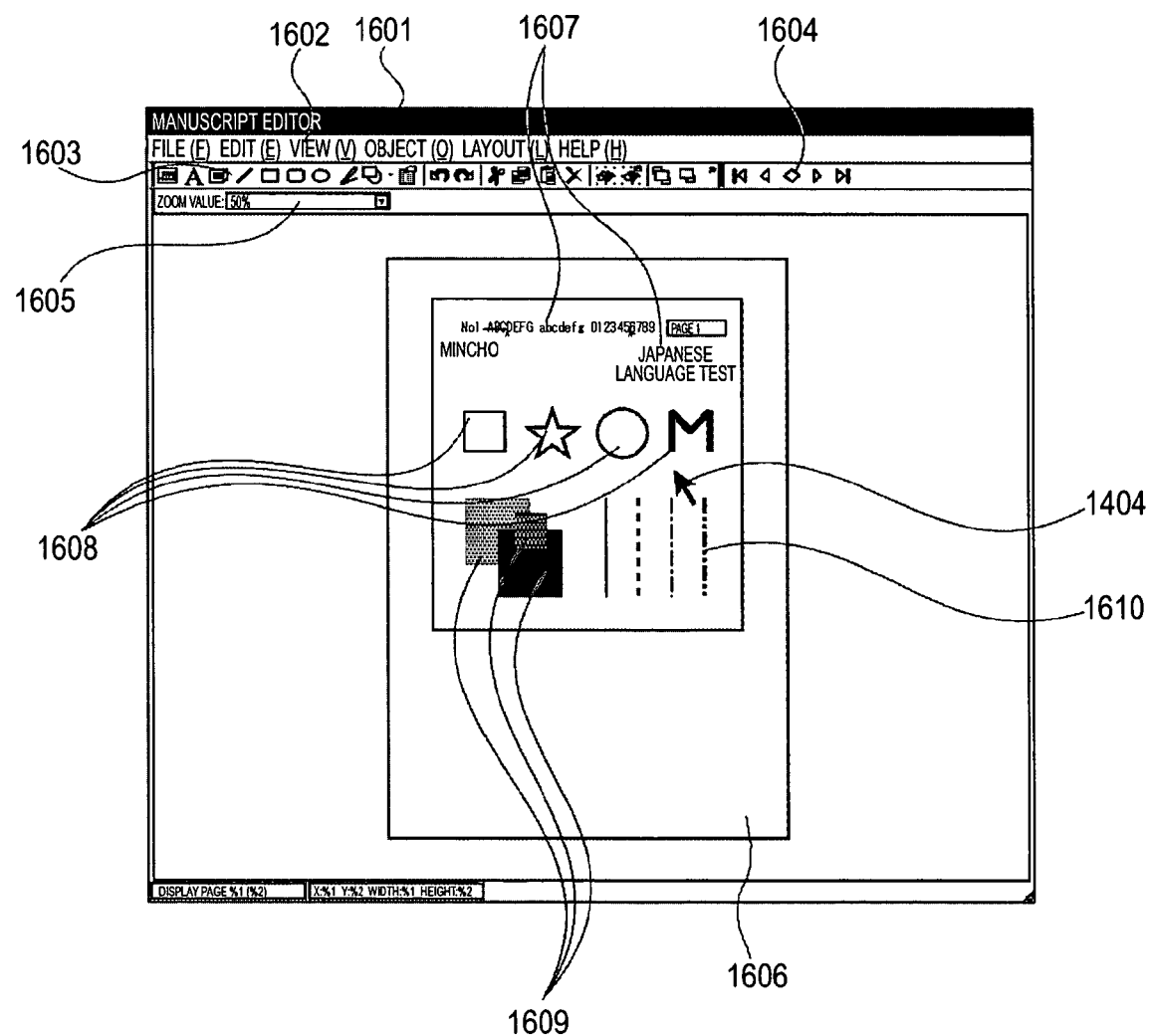
FIG. 16 is an illustration of an example of a main UI screen of the manuscript editor.

The UI includes a binding application representation 1401, pages 1402 of an imported manuscript file, and a popup menu 1403 indicated when the manuscript file is selected. As shown in FIG. 14, page 1 is selected and the popup menu 1403 is displayed. FIG. 14 also shows a mouse pointer 1404. Activation of the manuscript editor is executed by selecting the imported manuscript file with the mouse pointer 1404, displaying the popup menu 1403, and selecting the "MANUSCRIPT EDITOR" in the popup menu 1403. When the manuscript editor is directed to be activated as shown in FIG. 14, the manuscript screen (described later) shown in FIG. 16 is displayed. Although the activation of the manuscript editor with the popup menu 1403 has been described here, it may be performed in other manners (using, for example, tool buttons and menu items).

Next, editing functions that can be performed by the manuscript editor are described below. FIG. 16 shows the entire UI 1601 of the manuscript editor. The entire UI 1601 includes a menu bar 1602 and tool buttons 1603 for commanding various types of processing, page moving buttons 1604, a zooming specifying box 1605, a content representation 1606 of a manuscript file to be edited, text objects 1607, graphic objects 1608 and 1609, and straight line objects 1610. By using these, the editing functions are described. By using the manuscript editor, various type of editing, such as text editing, text box editing, image editing, and object editing, which are described later, on graphic forms and characters, can be performed. This makes it possible to generate an electronic document reflecting the various types of editing.

Text Editing Function

Figure 17:
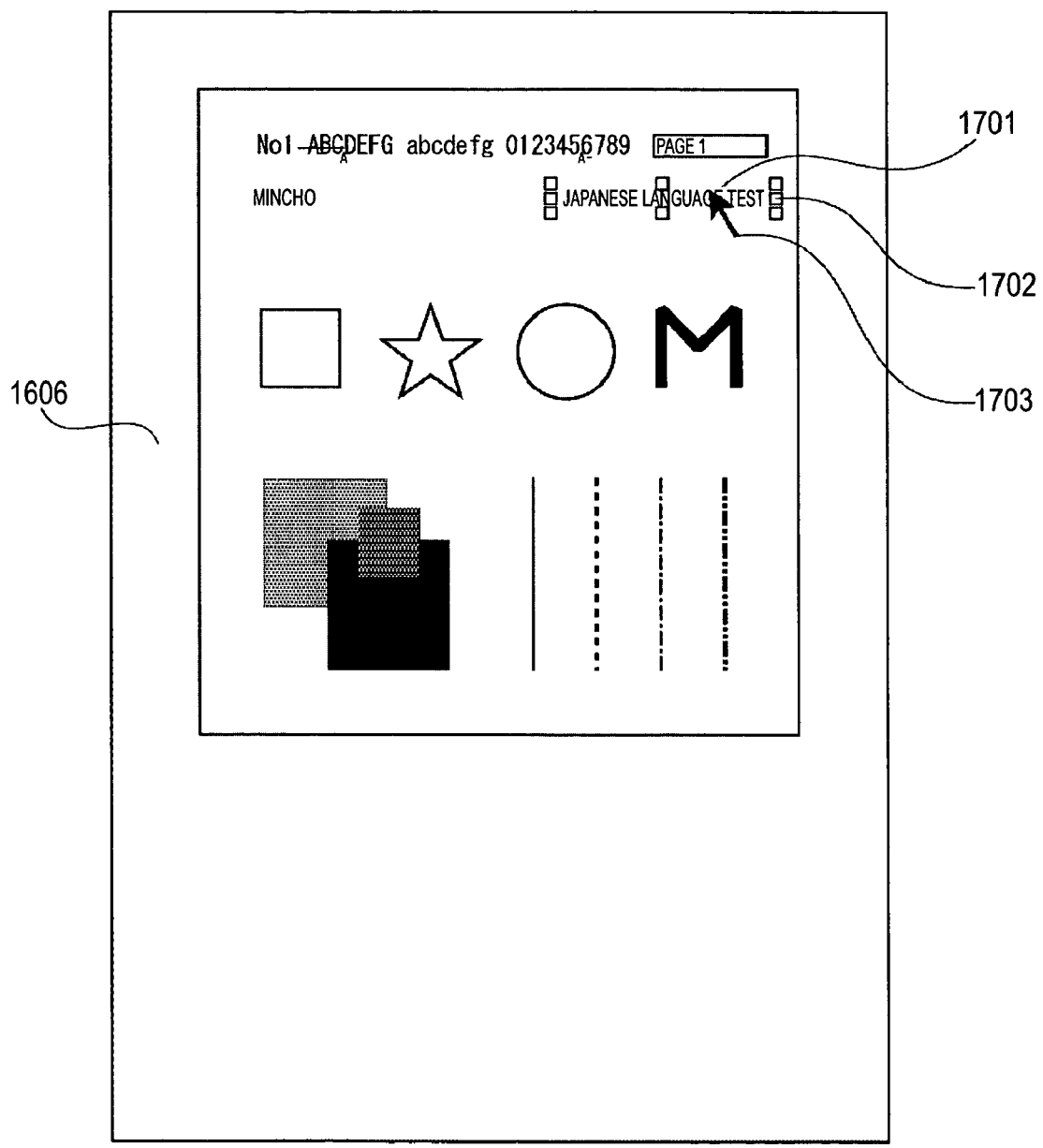
FIG. 17 is an illustration of an example of selection of a text object in text editing.

FIG. 17 shows an example of display in which a text object is selected. Details of the content representation 1606 shown in FIG. 16 are shown. FIG. 17 shows a text object 1701, an object control handle 1702, and a mouse pointer 1703.

By using the mouse pointer 1703 to select a point (within the rectangle of the text box) on text in the manuscript file, the selected text is subject to matching as an object, and enters a selected state. In the object in the selected state, the control handle 1702 is displayed to report the selection to the user. Although, in this example, the control handle 1702 is displayed, a circumscribed rectangle of the text object 1701 may be displayed. Types of operation, such as movement, deletion, text attribute change, and addition and deletion of text, can be selectively performed on the text object 1701.

Figure 18:
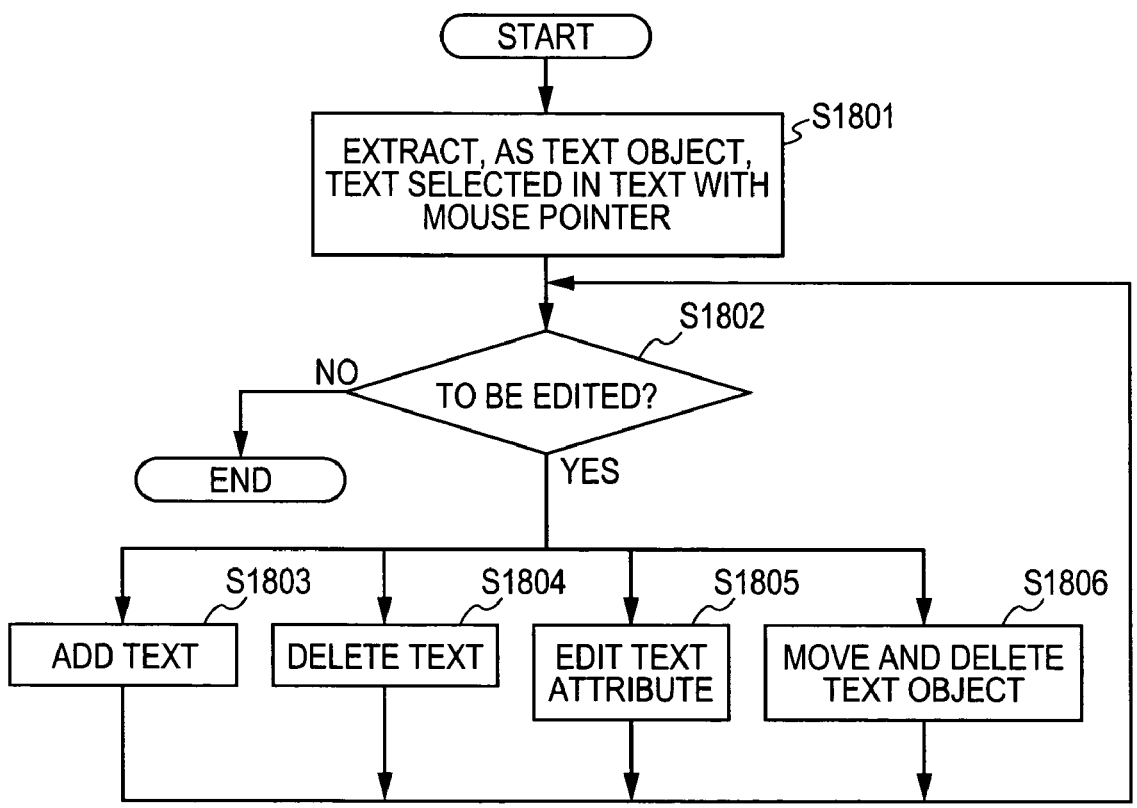
FIG. 18 is a flowchart showing a process for executing text editing.

FIG. 18 is a flowchart of text editing on the text object 1701 shown in FIG. 18. In step S1801, text in the manuscript file selected with the mouse pointer 1703 is extracted as the text object 1701.

In steps S1802 to S1806, editing, such as text addition, text deletion, text attribute change, and text object movement and deletion, is performed on the extracted text object 1701. When an editing-end instruction is confirmed, editing is finished.

Figure 19:
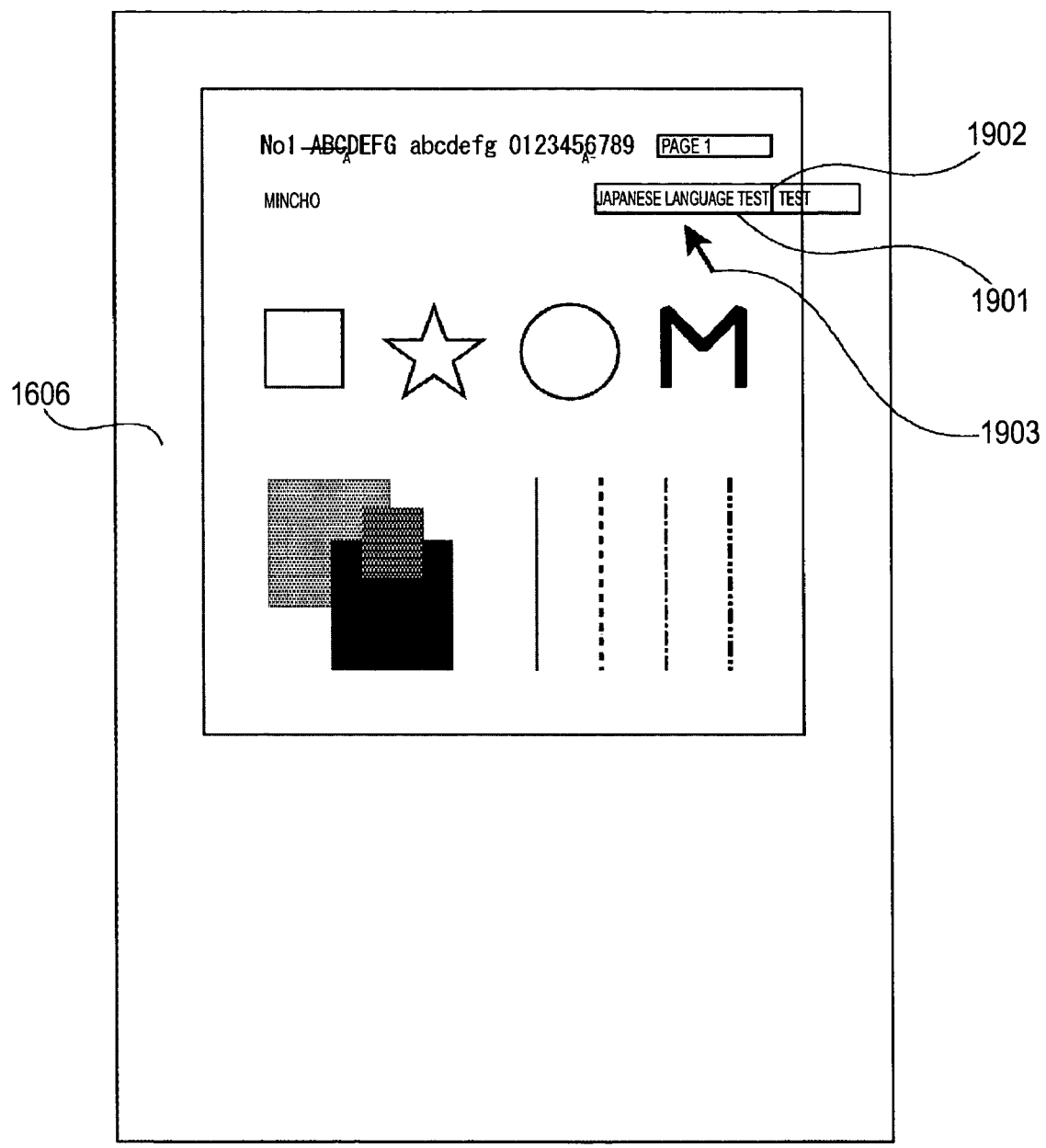
FIG. 19 is an illustration of an example of adding text in text editing.

FIG. 19 shows an example of text addition. FIG. 19 shows that text is added to the text object 1701 shown in FIG. 17. By using a mouse pointer 1903 (1703) to re-select the text object in the selected state, the text object is surrounded by a rectangle 1901 and an editing cursor 1902 is displayed. By moving the editing cursor 1902 to a position at which text is added and entering characters through a keyboard or the like, the characters are added in the text object. FIG. 19 shows a case in which "TEST" is added just before the "TEST" of "JAPANESE LANGUAGE TEST".

Figure 20:
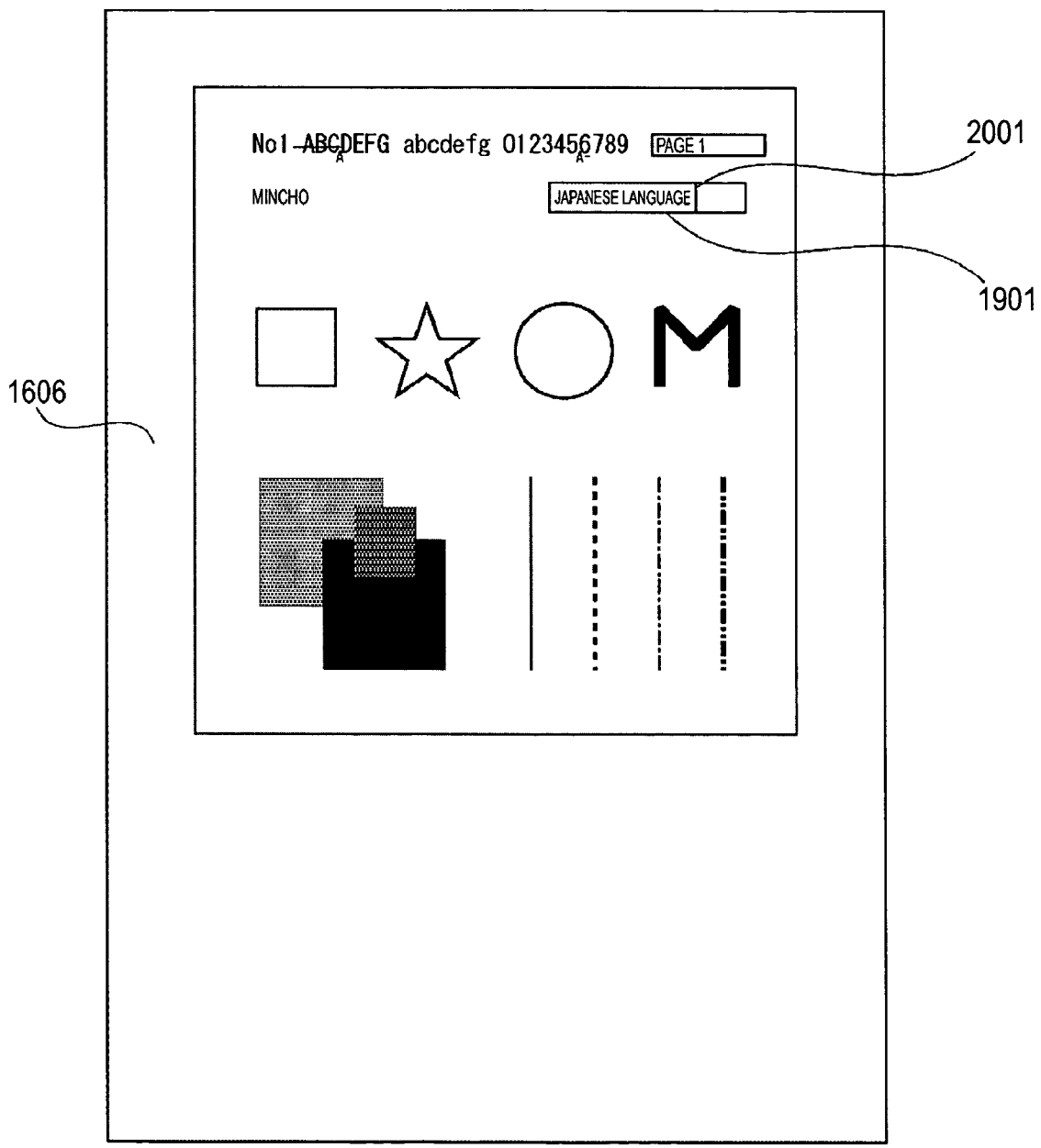
FIG. 20 is an illustration of an example of deleting text in text editing.

FIG. 20 shows an example of text deletion. In this example, text deletion is performed from the text object 1701 shown in FIG. 17. By using a manner similar that for text addition, the text object 1701 is surrounded by the rectangle and an editing cursor 2001 is displayed. In this state, by executing backspacing and deletion, a character just before the editing cursor 2001 is deleted. FIG. 20 shows a case in which "TEST" of "JAPANESE LANGUAGE TEST" has been deleted.

Regarding text attribute editing, text in each text object has attributes, and the attributes can be also edited. Text attributes include a font, a style, a size, a color, character decoration, character spacing, a horizontal scaling factor, and word spacing. The meanings and setting thereof are not described since they are well-known.

Text Box Editing Function

Although the above text object editing is limited to one line, the manuscript editor has a function of generating new text in plural lines. To generate plural lines of text, a text box is used.

Figure 22:
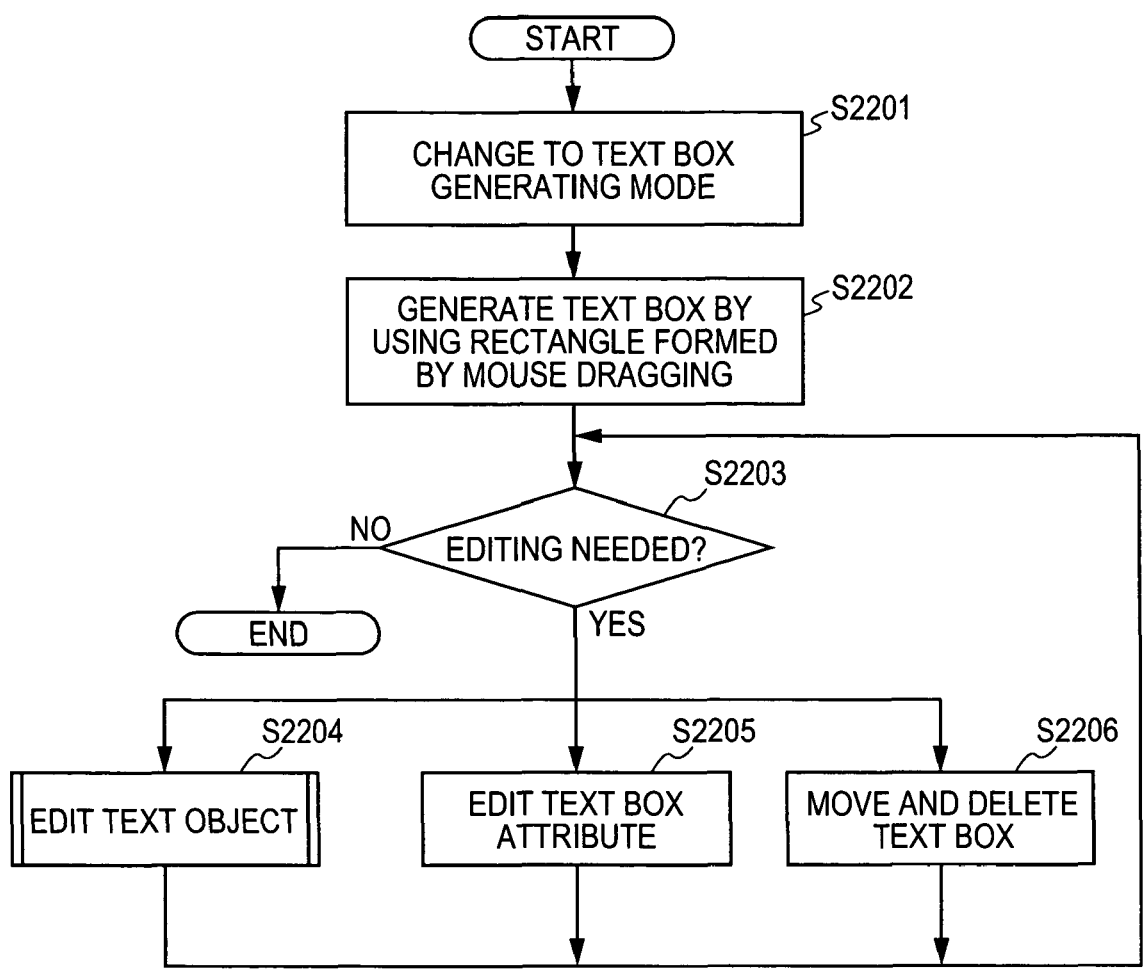
FIG. 22 is a flowchart showing a flowchart showing a text box editing process.

FIG. 22 is a flowchart of text box editing. After, in step S2201, the present mode is changed to a text box generating mode, in step S2202, a text box is generated by a rectangle formed by mouse dragging. Next, text object editing (this editing is similar to the single-line-text editing operation) in step S2204, text box attribute editing in step S2205, and text box movement and deletion in step S2206 are performed. After the editing finishes, the editing process ends.

Figure 21:
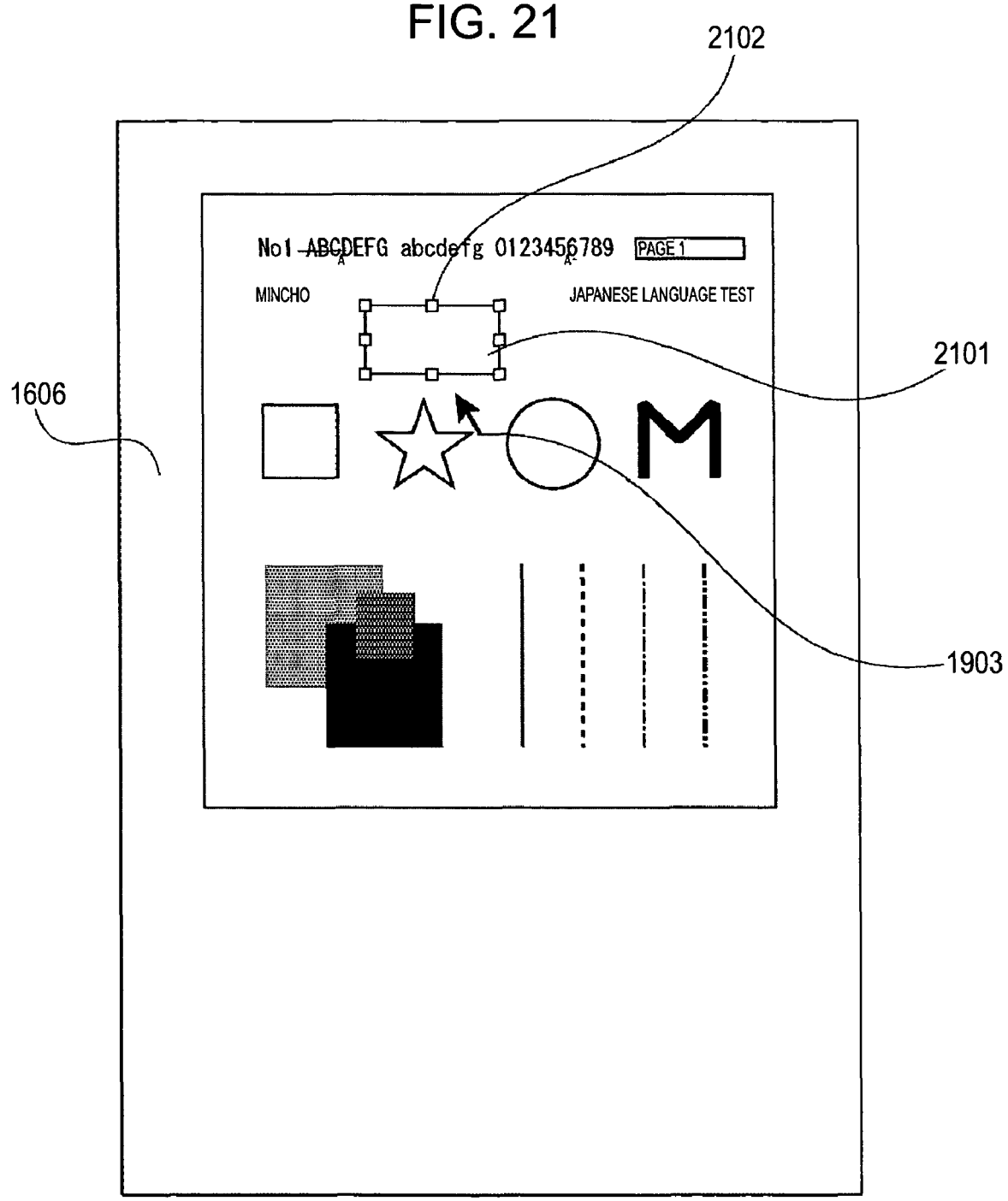
FIG. 21 is an illustration of an example of generating a text box in text editing.

FIG. 21 shows an example of generating a text box. By using the mouse pointer 1903 to draw a rectangle on a manuscript file 1606 in the text box generating mode, a text box 2101 is generated. In addition, further text box addition can be performed, thus enabling addition of plural text boxes. In the generated text box, a control handle 2102 is displayed at a newly generating time and a box selecting time. By using the mouse pointer to drag the control handle 2102, box resizing can be performed.

Figure 23:
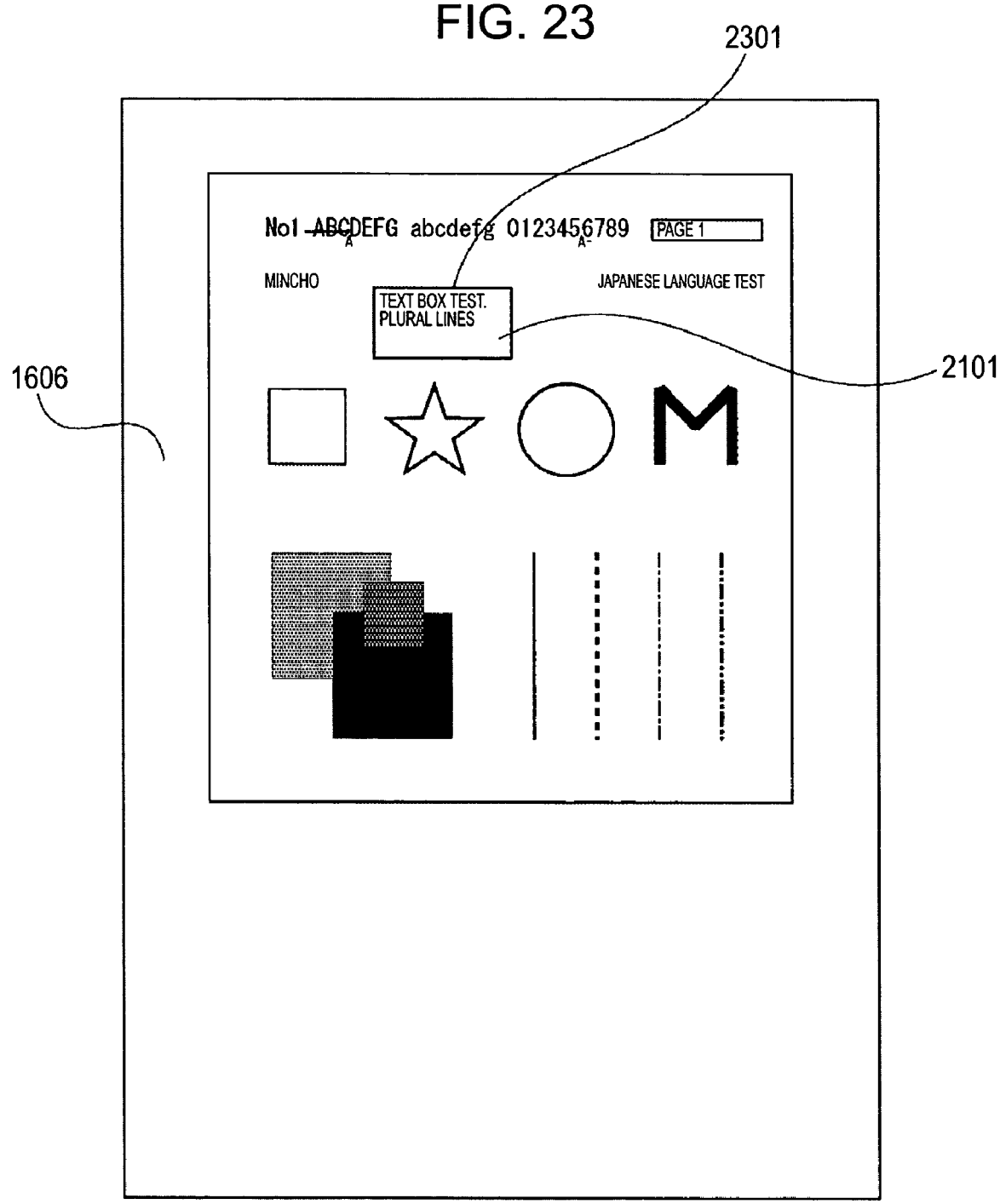
FIG. 23 is an illustration of an example of adding text to a text box.

FIG. 23 shows an example of adding text in the above text box. By using the mouse pointer to select the text box in the selected state again, an editing cursor is displayed similarly to the case of text object editing. By entering text in the state, text can be added in the text box. In addition, text deletion can be performed in a manner similar to that in text object deletion. FIG. 23 shows a case in which the text "TEXT BOX TEST. PLURAL LINES" has been added in a text box 2101. As described above, the text box supports text in plural lines.

Text that cannot fit at or before a right end is broken to start at a new line for display, as denoted by reference numeral 2301.

Regarding the text box and text in the text box, the attributes thereof can be edited similarly to the case of a text object. The text box attributes include a line type, a line width, a line color, filling, and an opacity. The attributes of the text in the text box are similar to those of the text object. The meanings and setting thereof are not described since they are well-known.

Image Editing Function

Next, an image editing function of the manuscript editor is described below. The image editing function has "image insertion" and "image writing".

Figure 27:
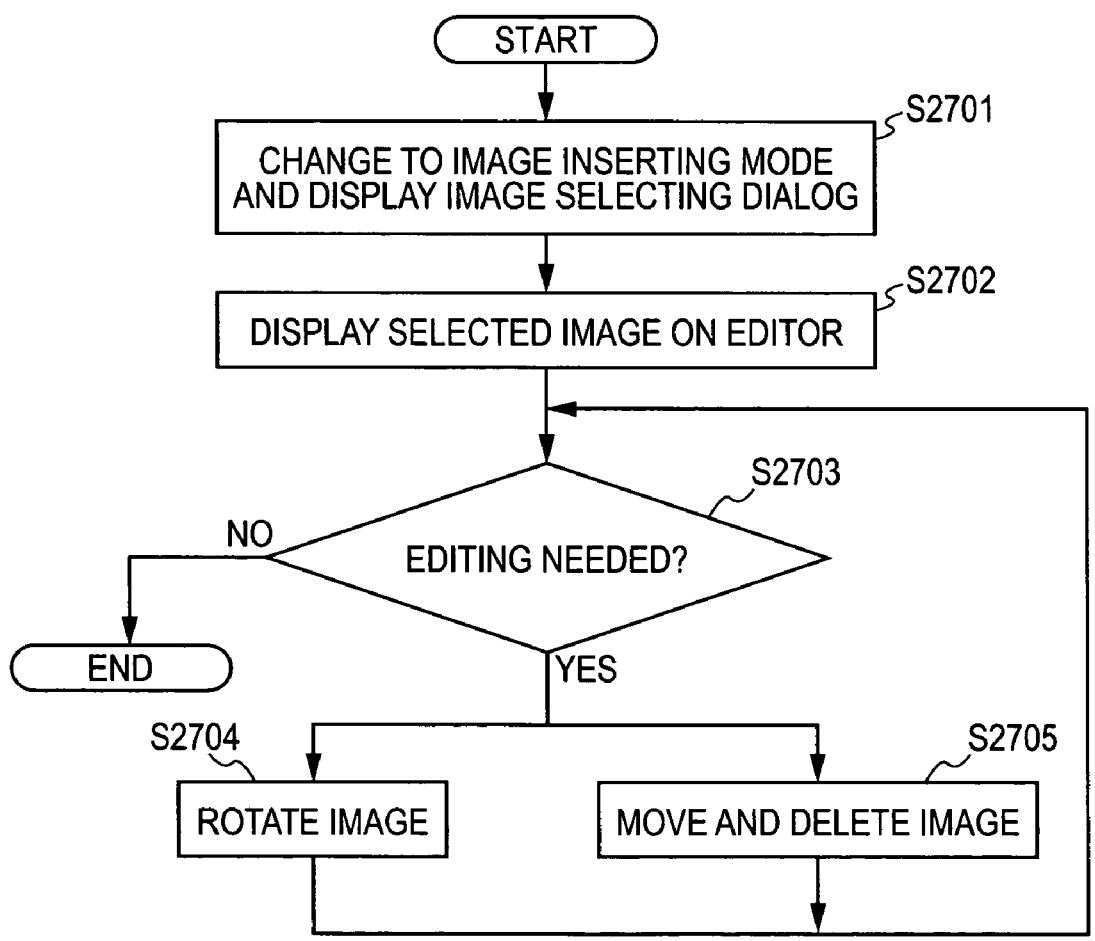
FIG. 27 is a flowchart showing an image inserting process.

Image insertion is described below. FIG. 27 is a flowchart showing an entire process of inserting, rotating, moving, and deleting an image. In step S2701, the present is changed to an image inserting mode and an image selecting dialog is displayed. In step S2702, an image selected with the dialog is displayed on the editor. Editing, such as rotation in step S2704 and movement and deletion in step S2705, is performed on the displayed image. After the editing finishes, the process ends.

Figure 24:
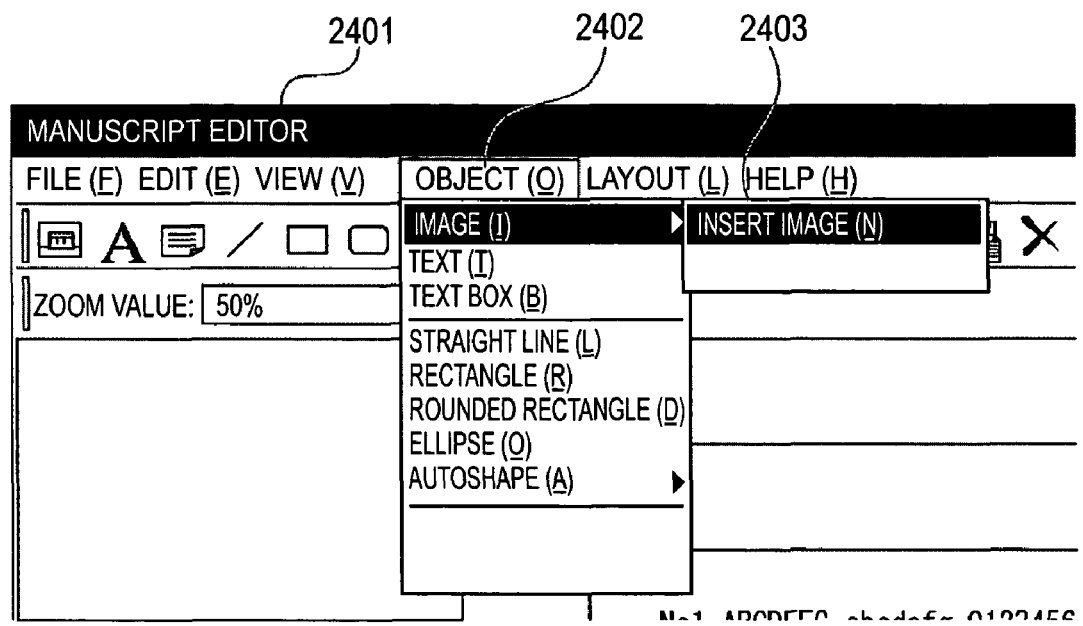
FIG. 24 is an illustration of an example of an image inserting menu in image editing.

FIG. 24 shows an example of a UI for changing to the image inserting mode. The UI has a manuscript editor 2401, a menu item 2402, and an image inserting mode menu item 2403. By selecting "INSERT IMAGE (N)" from a menu bar of the manuscript editor 2401, an image inserting dialog is displayed. By selecting an image file to be inserted in the image inserting dialog, the image is inserted as an image object on the manuscript.

Figure 25:
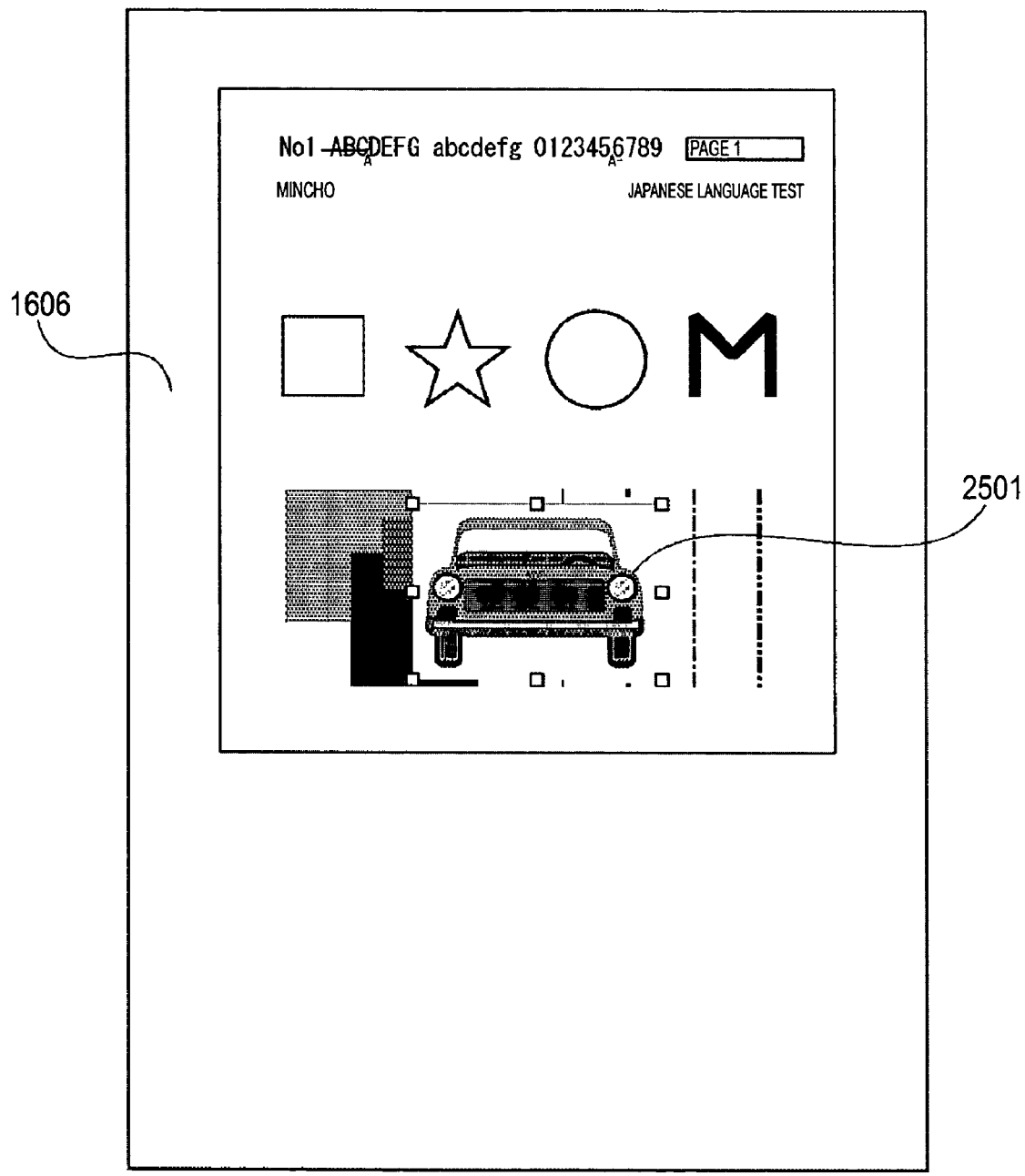
FIG. 25 is an illustration of an example of image insertion in image editing.

FIG. 25 shows an example in which an image has been inserted. By using the above manner to perform image insertion, an image 2501 is inserted in a manuscript file 1606. An insertion position at which the image 2501 is inserted is the center of the manuscript file 1606. However, the insertion position does not need to be limited to the center but may be changed to positions, such as a top left and bottom left of the manuscript file 1606, considering usability. In addition, regarding the insertion, not only insertion by using the menu, but also insertion by using tool buttons may be performed.

Figure 26:
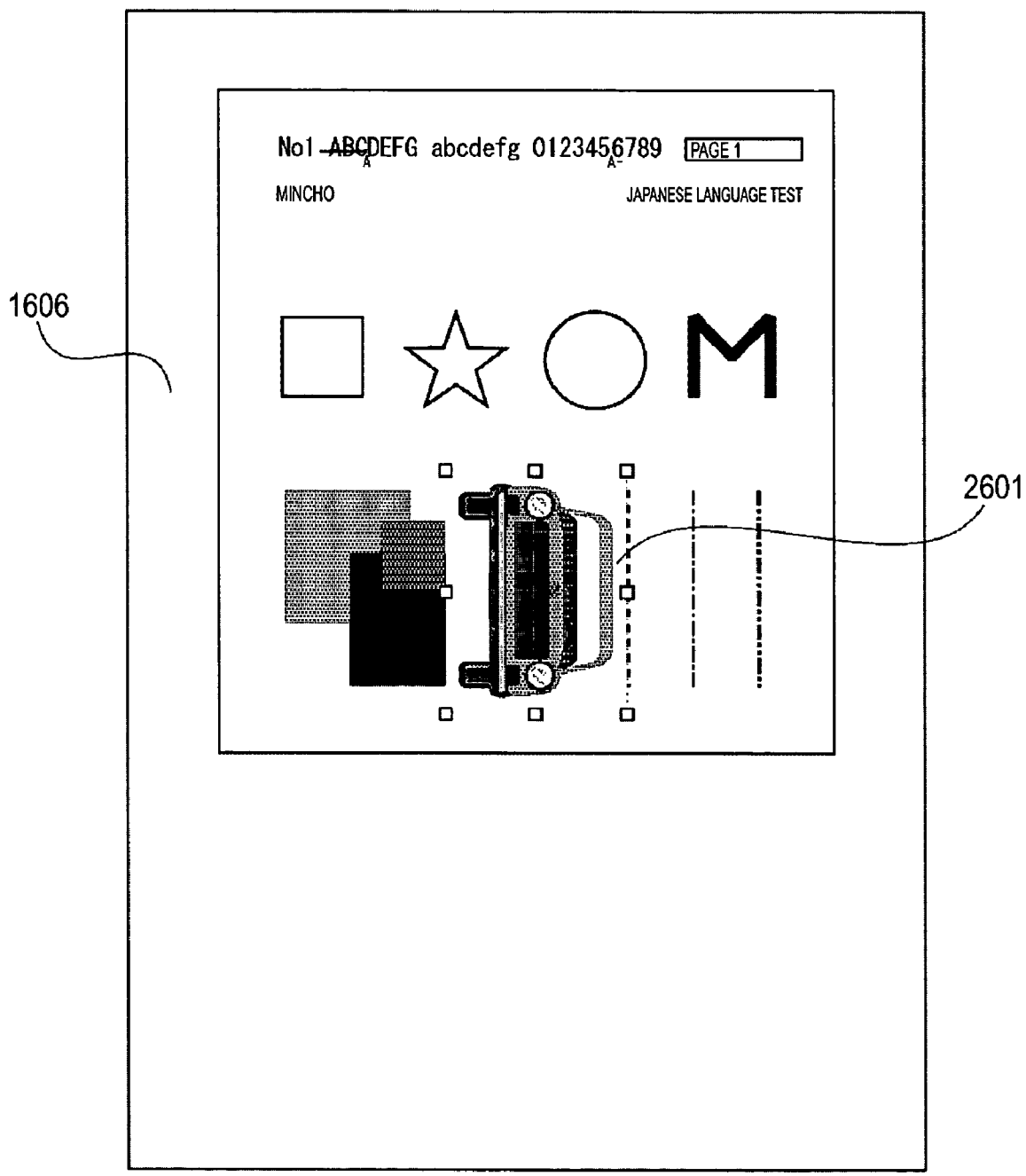
FIG. 26 is an illustration of an example of image rotation in image editing.

On the inserted image or image object placed in the manuscript file 1606, editing, such as rotation, movement, and deletion, can be performed. FIG. 26 shows an example in which the image 2501 has been rotated. An image 2601 indicates the image 2501 that has been clockwise rotated 90 degrees. The movement and deletion are not described since both are well-known.

Figure 28:
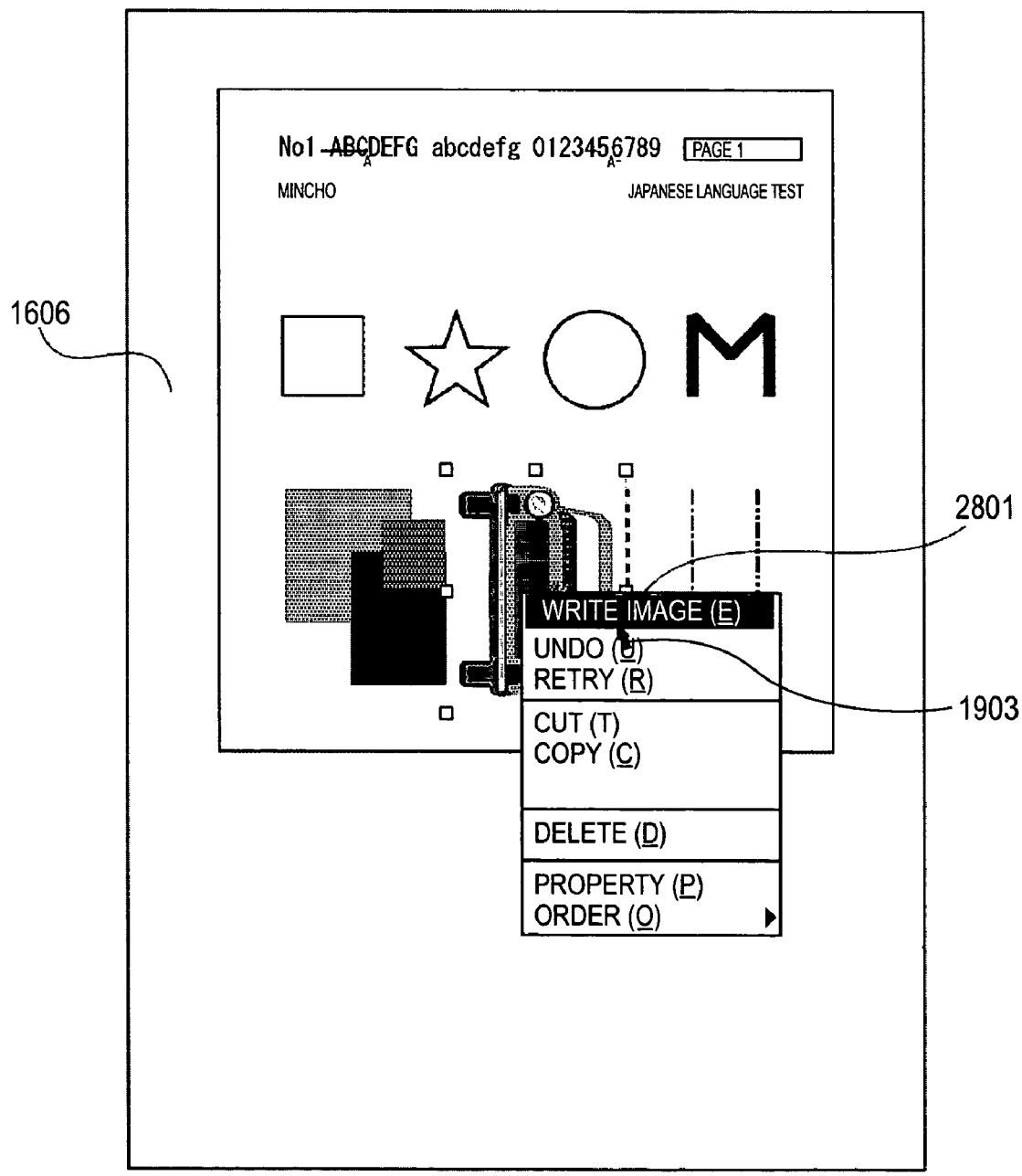
FIG. 28 is an illustration of an example of an image writing menu in image editing.
Figure 29:
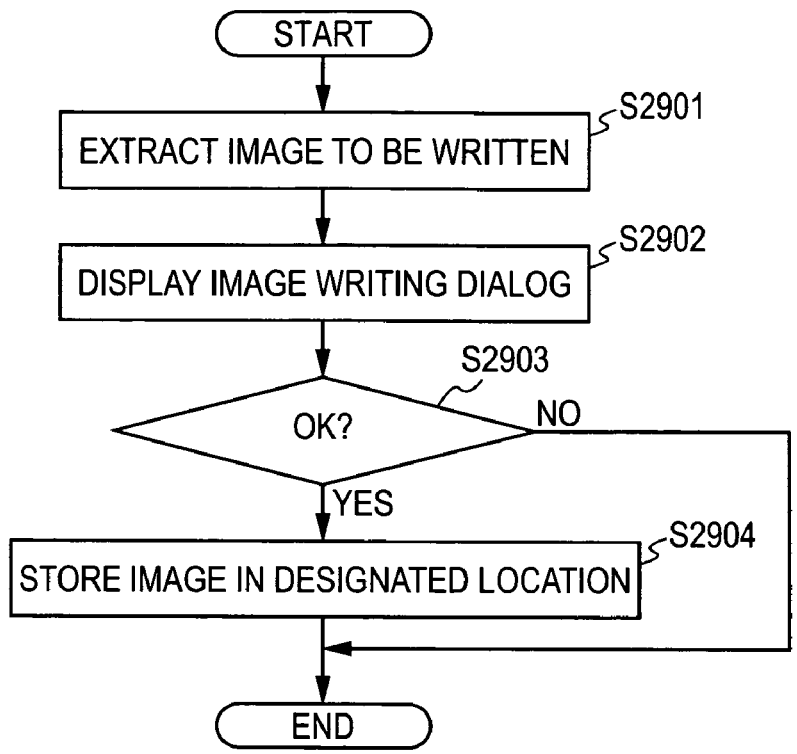
FIG. 29 is a flowchart showing an image writing process.

Next, image writing is described below. FIG. 29 is a flowchart showing an image writing process. In step S2901, by selecting an image that is to be written, the image is extracted. In step S2902, an image writing dialog is displayed by using a popup menu or the like. In steps S2903 and S2904, by entering information such as a location in which the image is written, and an image file name, and confirming the information, the image is stored in the specified location. FIG. 28 shows an example of image writing. An image to be written is selected, a popup menu 2801 is displayed, and image writing is designated. Designation of image writing displays an image writing dialog. By using the writing location and image file name set in the displayed dialog, the image writing is performed.

Object Editing Function

Figure 32:
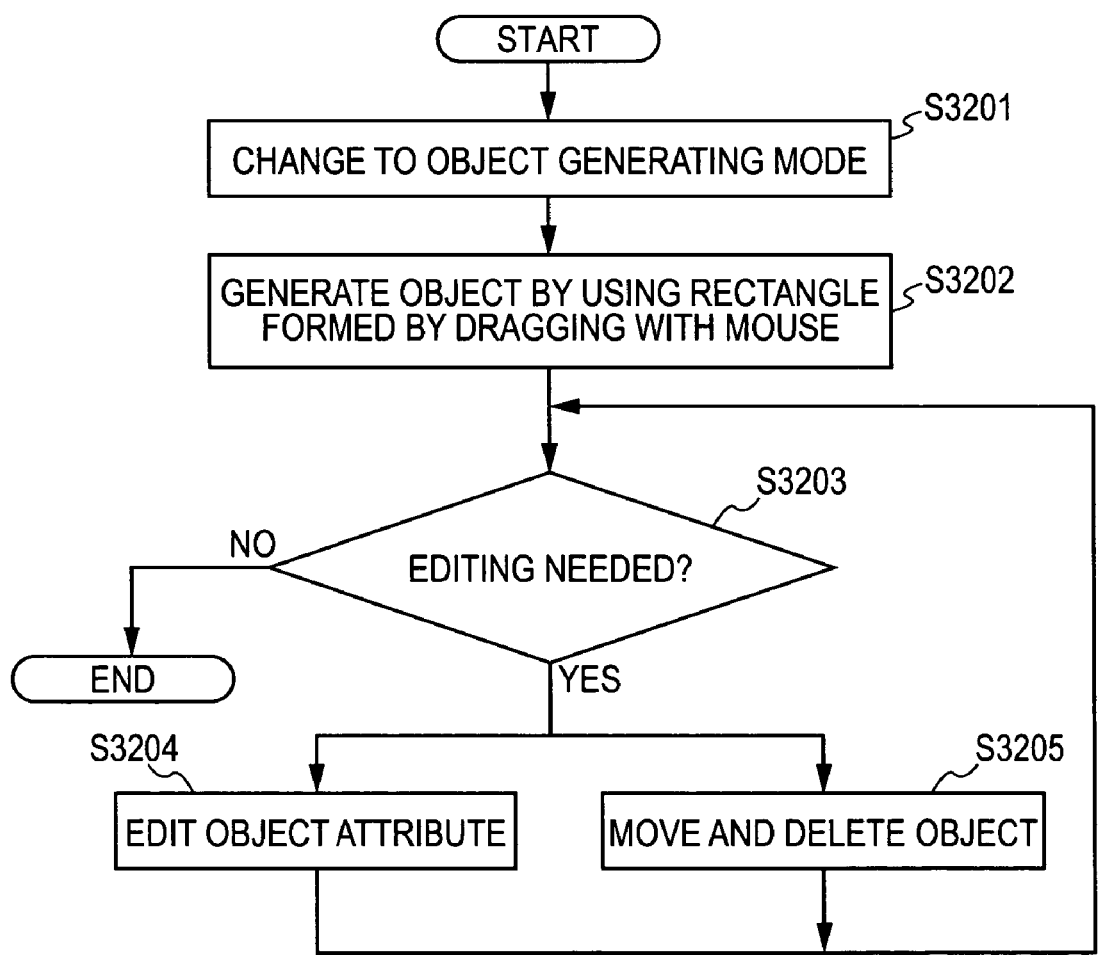
FIG. 32 is a flowchart showing an example of new generation in object editing.

Next, an object editing function of the manuscript editor is described below. Object types include a quadrangle, an ellipse, a rounded quadrangle, an autoshape, and another arbitrary graphic form. Their objects can be newly generated and edited. For an object drawn in the manuscript file, selection and editing can be performed. Regarding newly generating operation and editing operation, technologies for movement and deletion, and change of attributes (such as a color and line type) are well-known. Accordingly, a description of each technology is omitted. FIG. 32 is a flowchart showing an object editing process. After, in step S3201, the present mode is changed to an object generating mode, in step S3202, an object is generated by using a rectangle formed by mouse dragging. Object editing, such as editing of object attributes (in step S3204), and object movement and deletion (in step S3205), is performed. After the editing, the process ends. Next, an example of generating a new ellipse is described below.

Figure 30:
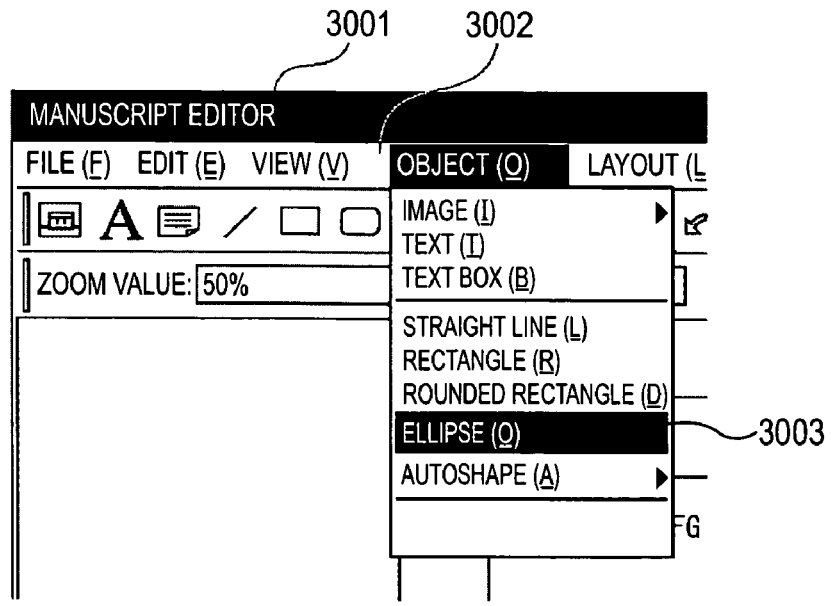
FIG. 30 is an illustration of an example of an ellipse generating menu in object editing.
Figure 31:
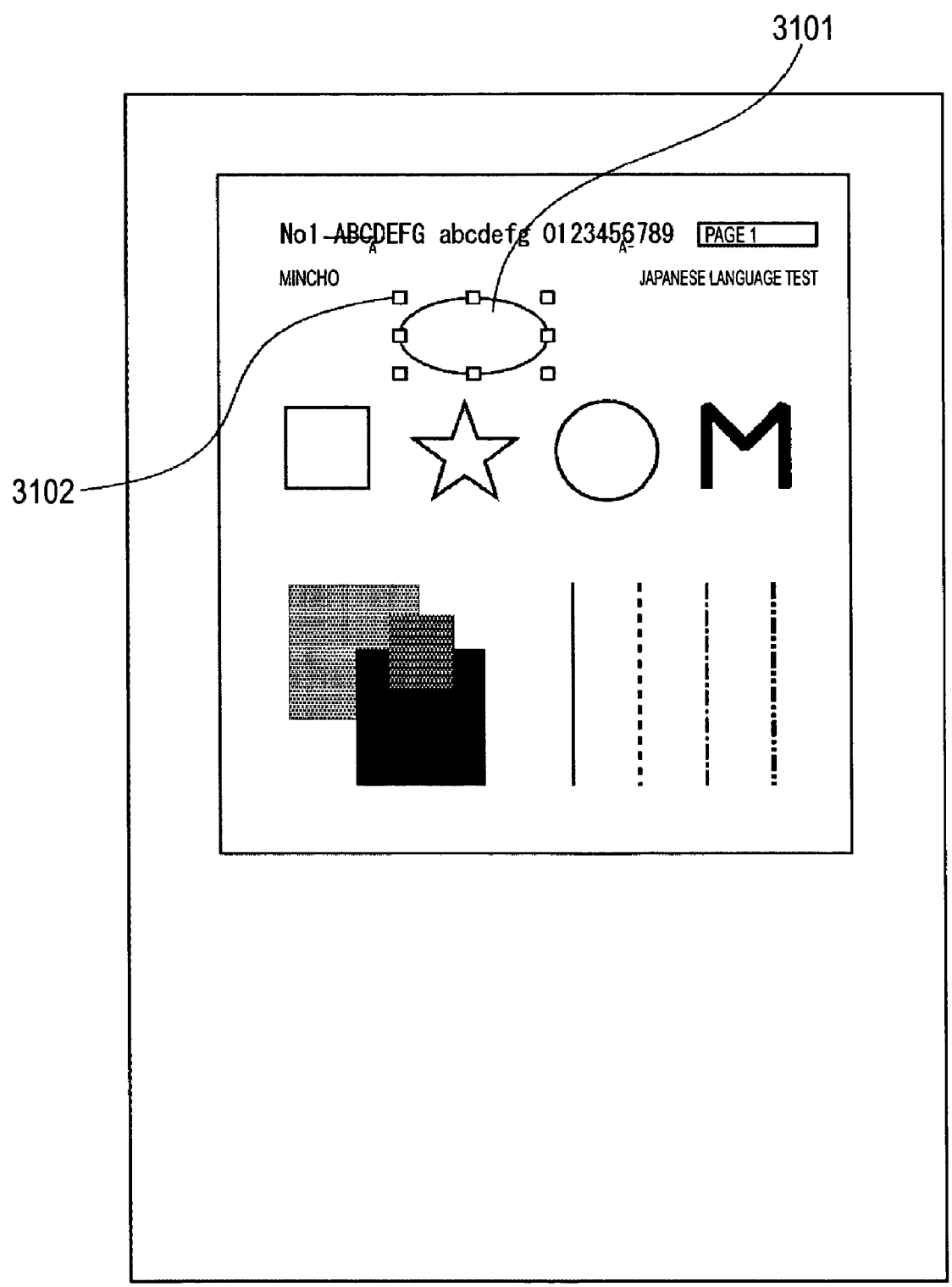
FIG. 31 is an illustration of an example of generating an ellipse in object editing.

FIG. 30 shows an example of a UI for changing to an ellipse-object newly generating mode. The UI has a manuscript editor 3001, a menu 3002, and a menu item 3003 for changing to an ellipse generating mode. By selecting the menu item 3003 and drawing a rectangle on the manuscript editor 3001 with the mouse, an ellipse object is generated. FIG. 31 shows an example in which an ellipse object 3101 has been generated. When the ellipse object 3101 is in n selected state, a control handle 3102 is displayed for the ellipse object 3101, thus reporting, to the user, that the ellipse object 3101 has been selected.

Figure 33:
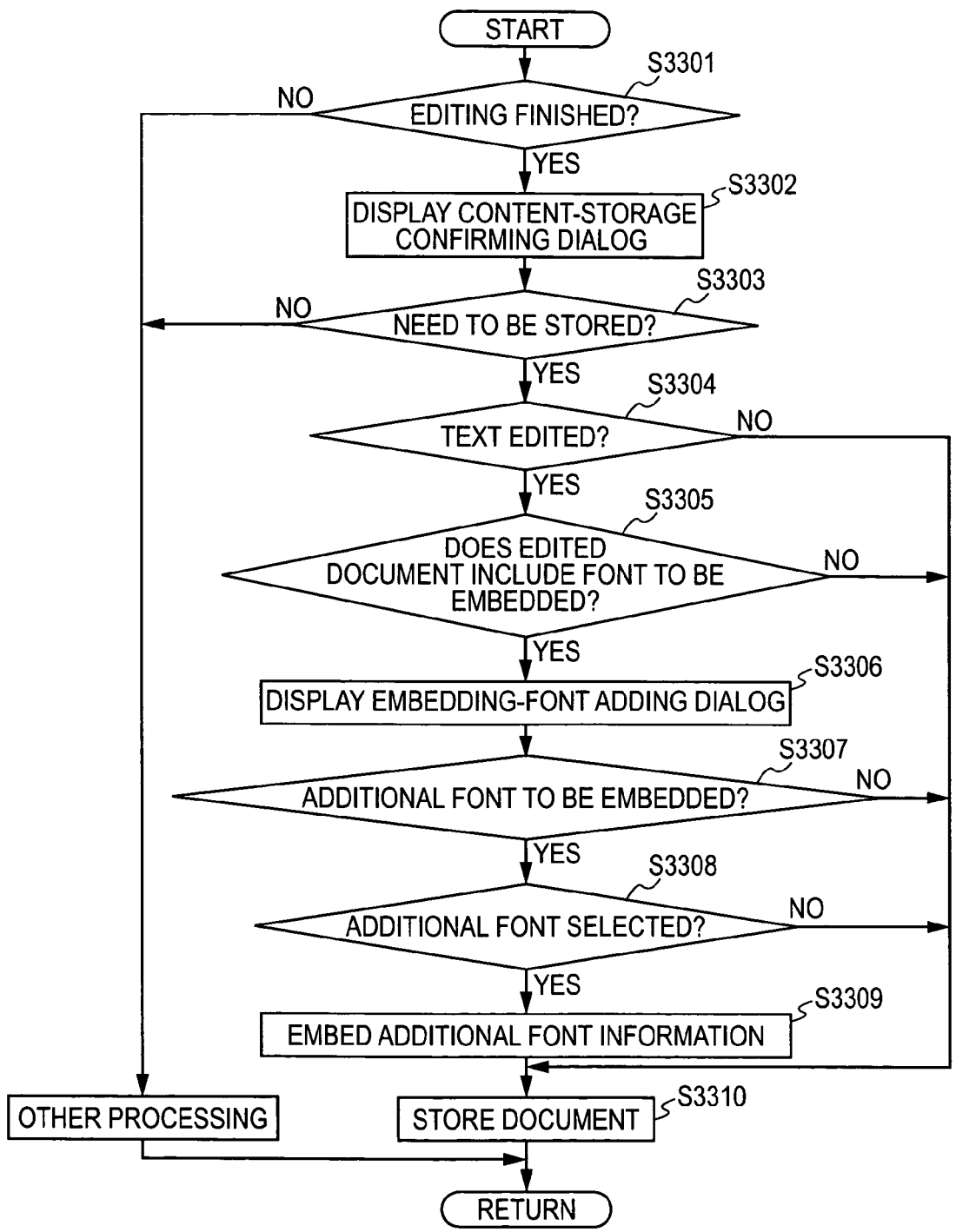
FIG. 33 is a flowchart showing a font information embedding process.
Figure 34:
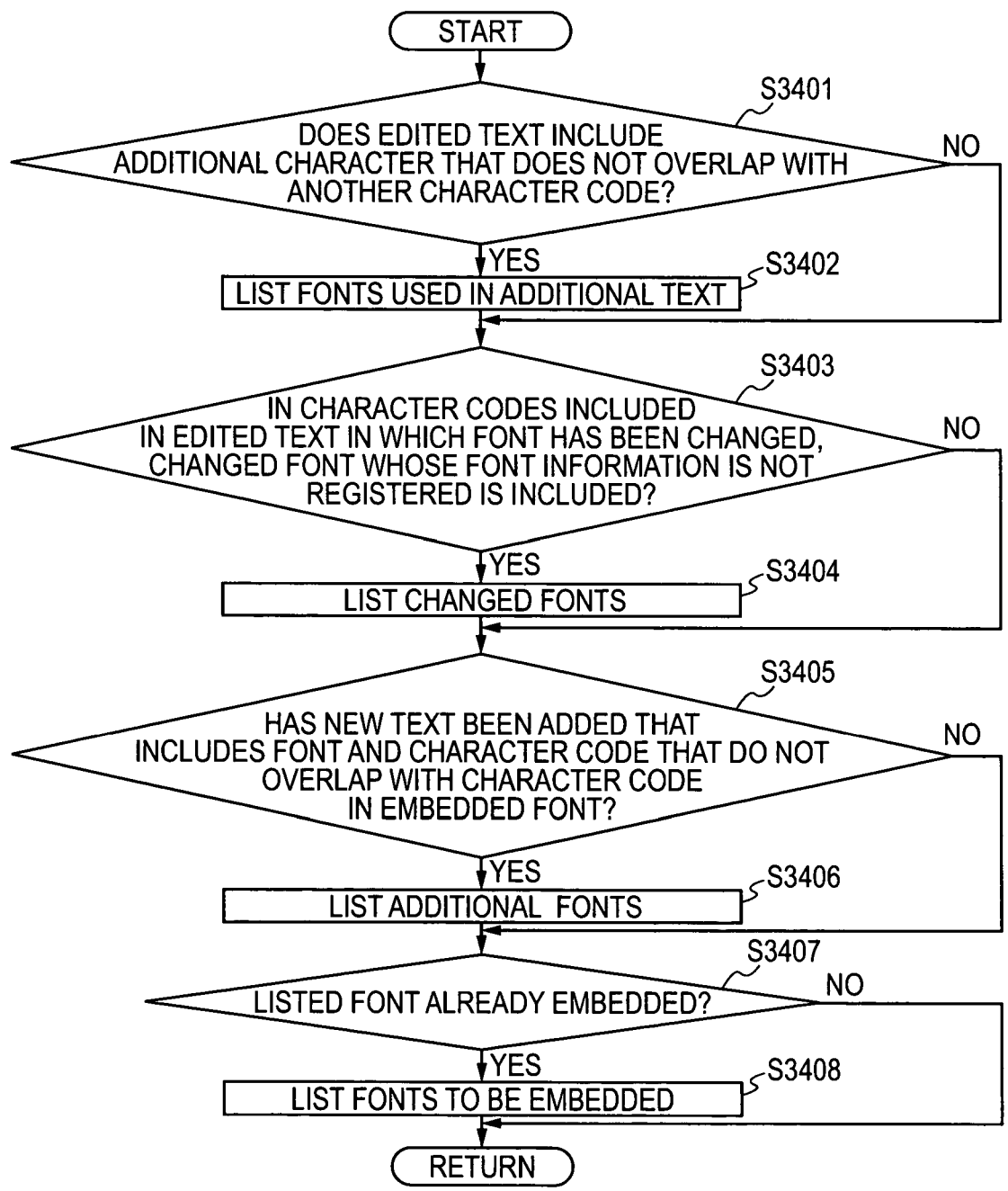
FIG. 34 is a flowchart showing a font information embedding process in an embodiment of the present invention.
Figure 35:
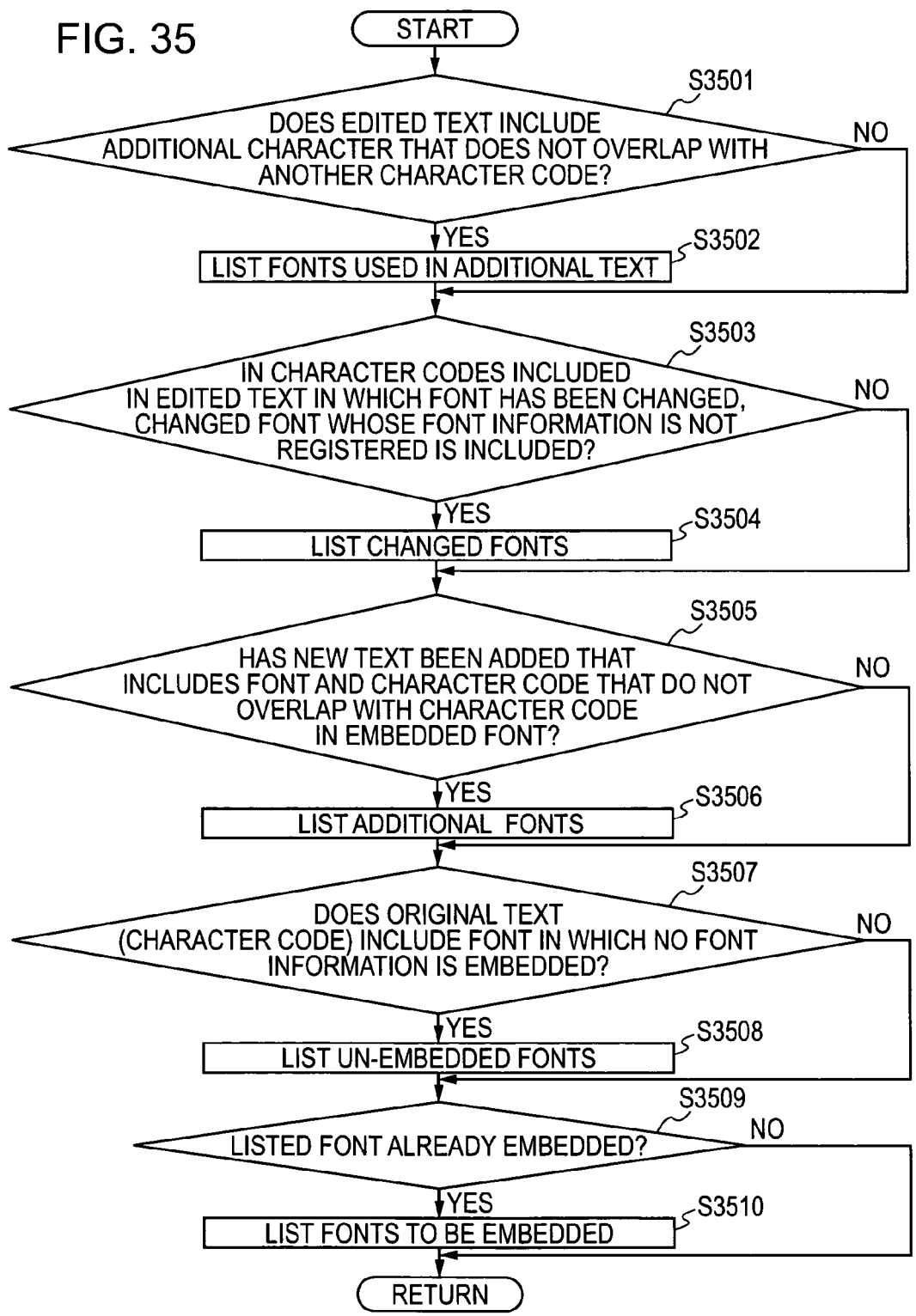
FIG. 35 is a flowchart showing a font information embedding process in an embodiment of the present invention.

FIGS. 33 to 39 are illustrations concerning processing for embedding font information. When an electronic document has a plurality of pages, a process represented by the flowchart shown in FIG. 33 is performed on all portions (pages) in which text editing is reflected. A process represented by the flowchart shown in FIG. 35 is performed on the entirety of an electronic document.

Figure 39:
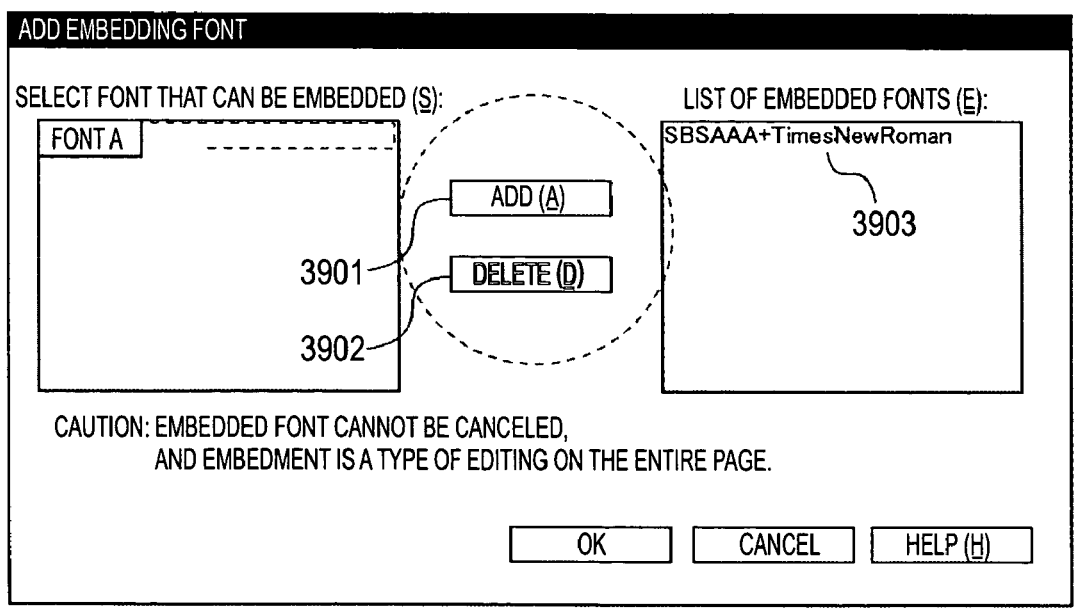
FIG. 39 is an illustration of a dialog for adding an embedding font in an embodiment of the present invention.

FIG. 33 shows a process that is executed in an information processing apparatus capable of editing an electronic document, such as a PDF document, in which font information can be embedded. In particular, a process is described below in which, based on generation of an electronic document reflecting editing instructions on characters, a query concerning whether to embed font information is switched, and font information is embedded in response to the query. As shown in FIG. 39 (described later), for the query concerning whether to embed font information, a screen on which embedment of new font information can be finally directed may be used.

Figure 37:
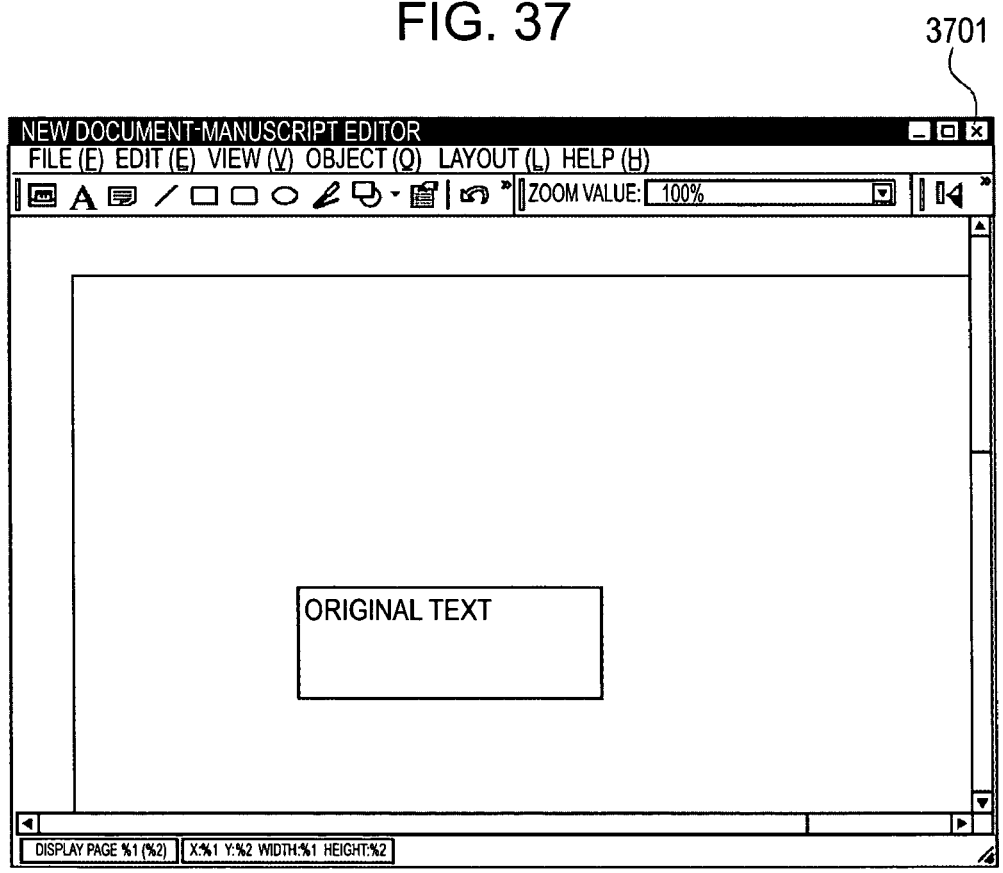
FIG. 37 is an illustration of an example of a manuscript editor before editing is performed in an embodiment of the present invention.

In step S3301, it is determined whether, while the user is performing editing by the manuscript editor, editing termination or storing of an edited electronic document has been directed. In a case in which, when the user finishes editing, editing termination is directed such that the user selects the "CLOSE" item of the "FILE" menu, or a button 3701 at the top left end in FIG. 37 is pressed, it is determined that the process finishes.

Figure 36:
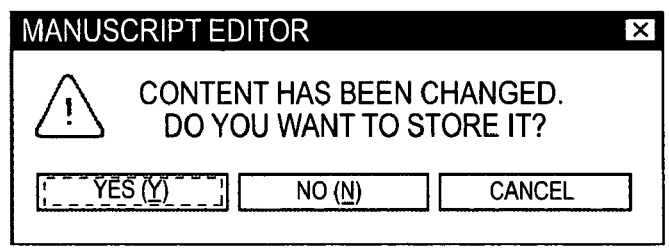
FIG. 36 is an illustration of an example of a dialog for urging a user to store content in an embodiment of the present invention.

If, in step S3301, it is determined that editing has finished, then in step S3302, a content-storage confirming dialog is displayed. This is a step that prompts the user to store the contents of the electronic document in conjunction with the determination made in step S3301. FIG. 36 shows an example of the dialog, which includes instruction inputting buttons "YES (Y)", "NO (N)", and "CANCEL".

Next, in step S3303, based on the user's selection in the dialog of FIG. 36, it is determined whether document storing has been directed. For example, it is presumed that document storing has been directed after it is determined that the "YES" button in the dialog of FIG. 36 was selected.

In step S3304, it is determined whether text (character) has been edited. This is a step in which it is determined whether text editing is included in an editing operation already performed by the user. As described above, in the editing operation, items other than text, e.g., graphic forms can be edited. If, in step S3304, text editing is not included, the following determination of font data embedment is not performed.

The determination in step S3304 may be achieved by detecting whether text-related editing has been performed in real time in association with editing of each type on characters or graphic form by using the manuscript editor, temporarily storing the result of detection as a history, and referring to the stored result with appropriate timing. Alternatively, the determination may be achieved by checking a difference in text between a previously stored document and a document before it is stored, and determining whether editing has been performed concerning text in which new font information is to be embedded.

A font typically represents a font name such as a Gothic font or a Mincho font, and includes font information, which is described later. In other words, a font includes a comprehensive representation of font, such as a conceptual representation of the entirety of information concerning a certain type of font.

In addition, font information includes specific commands and/or typeface information of fonts. For example, font information includes font names, glyphs (typeface patterns), hint information, and switching identifiers that are embedded when characters, positioned before and after a point, have different fonts.

Figure 38:
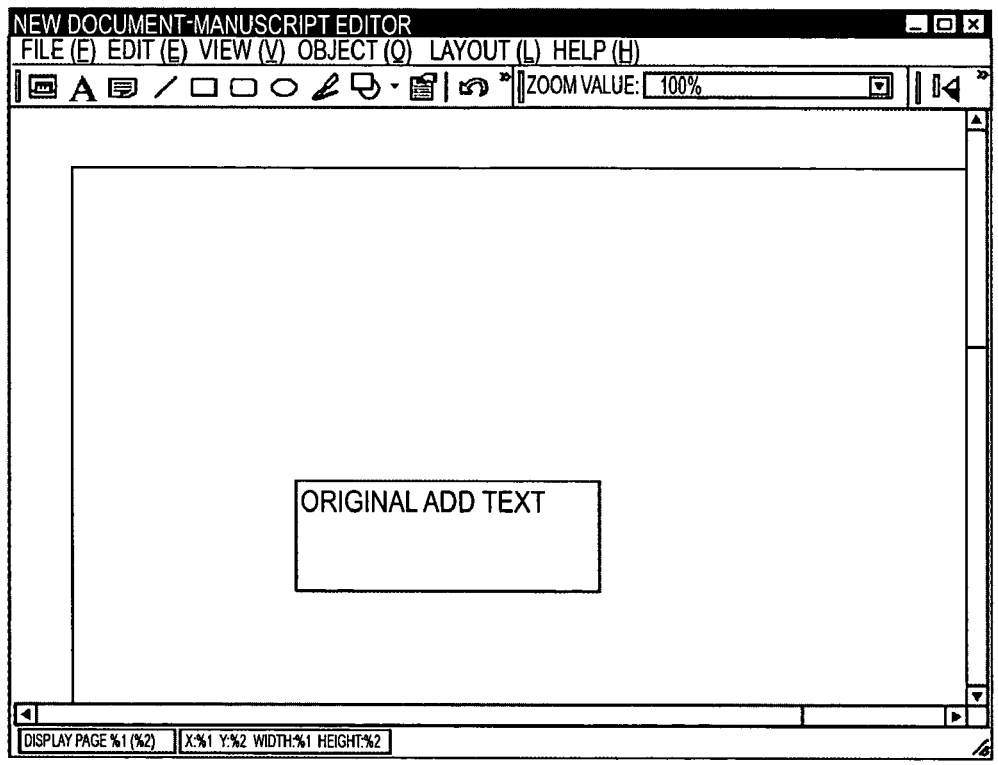
FIG. 38 is an illustration of an example of a manuscript editor after editing is performed in an embodiment of the present invention.

The text editing includes addition of characters to an existing character string, deletion of characters from an existing character string, change of fonts, and addition of new text. FIG. 37 shows a screen displayed before editing is performed, and FIG. 38 shows a screen displayed after the editing is performed. In FIG. 38, the characters "ADD" have been added and it is determined that the text has been edited.

Turning back to FIG. 33, in step S3305, it is determined whether the edited document includes a font to be embedded. Details of the determination in step S3305 are shown in FIG. 34.

First, in step S3401, it is determined whether the edited text includes additional characters. This corresponds to determination of whether a character string in which new font information is to be embedded has been edited for addition as in the above example. More specifically, it is determined whether text to be edited includes a character code which is included in font information already embedded in a subset font, and which does not overlap with another character code. A font of a type associated with text to be added is identified.

When text editing is performed as shown in FIGS. 37 and 38, and font information that corresponds to character codes for the characters "ADD" has not been embedded yet in a subset font, it is determined that the text has additional characters, and fonts used in the additional text are listed in step S3402. When the fonts used are fonts A, fonts A are listed.

Next, in step S3403, it is determined whether, in the edited text, the fonts have been changed. This is a step in which it is determined whether a font type has been changed (e.g., from font A to font B) by editing the existing text. More specifically, when font change is directed, it is determined whether text (character codes) in a text box to be edited includes a portion that does not overlap with text (character codes) already included in a subset font corresponding to a type of changed font.

If, in step S3403, it is determined that the fonts have been changed, then in step S3404, the changed fonts are listed.

Next, in step S3405, it is determined whether new text has been added. In addition to editing of existing text, the manuscript editor can perform addition of a new text object (e.g., the above-described text object 2102) and adding new text to the added text object. Step S3405 is a step in which it is determined whether text addition has been performed. More specifically, in step S3405, it is determined whether text (character codes) that does not overlap with text (character codes) already embedded as a subset font has been newly added in the newly generated text object.

If, in step S3405, it is determined that the new text in a font has been added, then in step S3406, additional fonts are listed.

Finally, in step S3407, it is determined whether the listed fonts have already been embedded. This is a step in which it is determined whether the fonts listed in the above determination have already been embedded.

In this case, font A has been embedded as a subset of "ORIGINAL TEXT", and the characters "ADD" added by editing are not originally used (Yes in step S3401). Thus, font information for the characters "ADD" has not been embedded. Then, it is determined that font A has not been embedded, and next fonts to be embedded are listed in step S3408. In other words, in step S3408, in this case, fonts A are listed.

Embedding a font is divided into two cases. In one case, all the character set of the font is embedded, and in the other case, a subset of characters in use is embedded. For example, when the total number of character codes is small, as in the case of alphanumeric characters, a form in which pieces of font information that correspond to all the character codes is proper. In addition, when the total number of character codes is very large, as in the case of the Japanese language, a form in which font information is embedded as a subset font is proper from a storage size standpoint. The following describes the case of employing a subset font for embedding font information.

Referring back to FIG. 33, as described above, determination (step S3305) concerning a font to be embedded in the edited document is performed based on listing (step S3408). In step S3306, an embedding-font adding dialog is displayed.

This is a step in which, in order to prompt the user to embed, based on the fonts listed by the above determination, the listed fonts, an example of a dialog (font-adding directing screen) for directing embedment of new font information is displayed as shown in FIG. 39. In another example, a user can be queried regarding embedding new font information, via a screen from which the user can select whether to perform simple embedment or whether to embed an automatically determined font via manual input (e.g., selection of a "yes" or "no" button), or via audio confirmation.

In FIG. 39, for the item "SELECT FONT THAT CAN BE EMBEDDED (S)" the already determined font A is indicated. Accordingly, to add this font A, a user selects an "ADD" button 3901, and font A is added in the "LIST OF EMBEDDED FONTS". Reference numeral 3903 depicts the results of selecting the "ADD" button 3901. By selecting a "DELETE" button 3902, a user can delete font A from the "LIST OF EMBEDDED FONTS".

Turning back to FIG. 33, the display of an embedding-font adding dialog in step S3306 is based on font listing based on the determinations in steps S3401, S3403, and S3405 of FIG. 34. However, step S3306 does not depend on whether a graphic form (including an image) editing instruction is reflected. In other words, the query as shown in FIG. 39 is not performed unless reflection of a character editing instruction is confirmed. If it is determined that the reflection of the character editing instruction is confirmed, the query as shown in FIG. 39 is performed.

In step S3307, it is determined whether an additional font is to be embedded. This is a step in which it is determined whether the "OK" button in the dialog in FIG. 39 has been selected. If the "OK" button is selected, it is determined that font embedment is performed.

Next, in step S3308, it is determined whether an additional font has been selected. This is a step in which, if it is determined, based on selection of the "OK" button in FIG. 39, that font embedment is performed, it is determined whether a font has been moved from the list "SELECT FONT THAT CAN BE EMBEDDED" to the "LIST OF EMBEDDED FONTS" in FIG. 39. If, after being selected as described above, font A is moved by selecting the "ADD" button 3901. Accordingly, it is determined that the additional font has been selected. Although, in the dialog, the "LIST OF EMBEDDED FONTS" is shown, font A has not been embedded yet at this time.

In step S3309, the additional font is embedded. This is a step in which the selected font is embedded in an actual document. In this step, font information of font A is read from a storage unit of an information processing apparatus in which the manuscript editor is activated, and is embedded.

The embedded information may be all font information concerning characters included in the electronic document associated with font A, or only font A corresponding to character codes (the character codes of the "ADD" in the above description) recognized to be embedded.

Finally, in step S3310, document storing is performed, whereby storing of the entirety of the document in which font information is embedded is finished.

Before and after step S3309 in which font information embedment is performed, font information that is unnecessary in the subset font is deleted from the electronic document, which is not shown in the flowchart shown in FIG. 33. In other words, in a case in which text is deleted through the manuscript editor, if it is determined that the electronic document does not include text identical to the deleted text (character codes), the font information of the deleted text is unnecessary. In addition, in a case in which a font is changed, if an unchanged font is not associated with other text, font information corresponding to the unchanged font is unnecessary. An information processing apparatus according to this embodiment includes a deleter which, based on generation of an electronic document reflecting editing instructions on text, determines unnecessary font information, and which deletes the font information determined to be unnecessary from the electronic document. This can prevent the storage size of the electronic document from being unnecessary increased.

Next, a font information embedding process associated with the process in FIG. 33 is further described with reference to FIG. 35. This corresponds to embedding un-embedded font of text on the original document at a document storing time. For example, in a case in which, after an electronic document generated by another user is read and opened by using the manuscript editor, text in the opened electronic document has no embedded font information and the text is not edited, the process in FIG. 35 can accelerate embedment of font information.

The determinations shown in the flowchart of FIG. 35 correspond to the above-described step S3305 in FIG. 33. In other words, the process of FIG. 35 is similar to the process of FIG. 34 as described above. Since the processes are similar, only the differences between the two will be described below.

In step S3507, it is determined whether, at an electronic document storing time or editing-termination time, the electronic document includes a font that is not embedded in the original font. This is a step in which, in addition to the above determination on edited text, it is determined whether font information of a font associated with text that is not to be edited has not been embedded yet.

For example, a determination is made whether, among subset fonts of font C associated with originally existing text, in character codes of at least some subset font, font information of font C is not embedded.

If, in step S3507, it is determined that the electronic document includes a font that is not embedded in the original font, then in step S3508, the un-embedded fonts are listed. This performs listing of unembedded fonts in the entirety of the document. As a result, the adding dialog (font addition directing screen capable of specifying additional fonts) shown in FIG. 39 is displayed. This prompts the user to embed fonts that are not originally embedded. Determination of whether to actually embed font information is as described above with reference to FIG. 33. Accordingly, a detailed description thereof is omitted.

Modifications

In the above-described step S3306 in FIG. 33, in response to implementation of editing a certain character (e.g., addition and change of an associated font), regardless of whether a subset font for a character different from the certain character has already been embedded, a font corresponding to the certain character is displayed as an option in the "SELECT FONT THAT CAN BE EMBEDDED" section of FIG. 39.

However, the adding dialog is not limited to the above. For example, the embedding-font adding dialog representation shown in FIG. 40 can be used. Reference numerals 4001, 4002, 4006, and 4007 are similar to reference numerals 3901, 3902, and 3903 as previously described with respect to FIG. 39, and thus a description thereof is omitted here.

Figure 40:
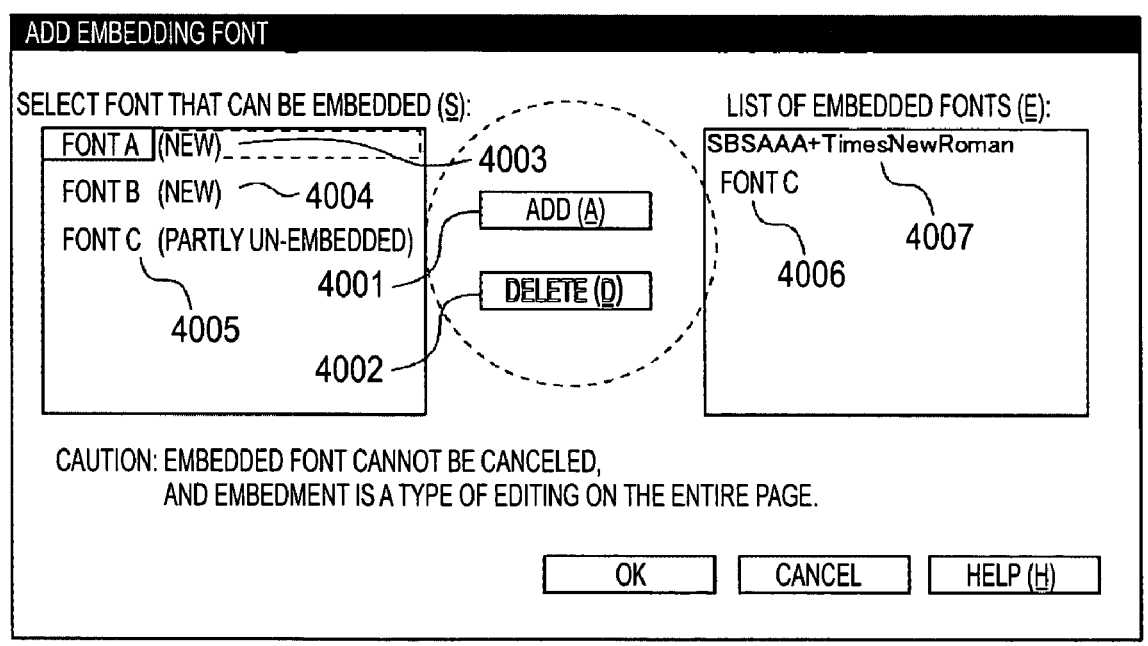
FIG. 40 is n illustration of a dialog for adding an embedding font in an embodiment of the present invention.

In the adding dialog shown in FIG. 40, reference numeral 4003 shows that font information including a glyph for font A is not embedded in the electronic document and is new. Reference numeral 4004 also shows a font in which new font information including a glyph is to be embedded.

In addition, reference numeral 4005 shows that, regarding font C, a subset font has already been embedded correspondingly to another character code and a new glyph needs to be embedded. As is denoted by reference numeral 4004, regarding some character code, a subset font has already been embedded.

Since, as shown in FIG. 40, a font already embedded correspondingly to some character is displayed in identifiable form, the user can be informed that each item indicated in the "SELECT FONT THAT CAN BE EMBEDDED" section displayed in the dialog is not a fully new font to be embedded. This can prevent, for example, confusion that a previously embedded font seems a fully new font to be added. In addition, in the above description, when text editing is performed in the electronic document, a query representation that can specify whether to embed new font information, as shown in FIG. 39, is displayed. The query is not limited thereto. For example, by designing the confirmation dialog displayed on the display unit in step S3302 to include a query about whether to embed new font information, when embedment of the new font information is directed by using the screen of the query, the above-described step S3304 and the subsequent steps may be performed.

Furthermore, in steps S3401, S3403, S3405, S3501, S3503, S3505, and S3507, in response to reflection of editing of text (character codes), it is determined whether font information coincident in character code and font is already included in a subset font in the electronic document. However, determination of whether to include new font information in the subset font can be also implemented by employing another mechanism.

For example, even if, in response to reflection of editing, regardless of whether font information coincident in character code and font is already included in the electronic document, in each of steps S3402, S3404, S3406, S3502, S3504, S3506, and S3508, fonts are listed, and, in steps S3407 and S3509, it is determined whether font information corresponding to text edited with the listed fonts is included in any subset font, it can be appropriately determined whether new font information is included in the subset font.

In addition, in the above description of step S3309 in FIG. 33, new font information to be added as a subset font in the electronic document is read from a storage unit of an information processing apparatus in which the manuscript editor is activated. However, the acquisition of the font information is not limited thereto.

For example, new necessary font information may be requested from an external information processing apparatus (e.g., a font server) capable of communication through a network, and the font information that is obtained as a response from the external information processing apparatus may be embedded in the electronic document.

In the above embodiment, the case of employing a subset font for font information embedment has been described. However, all information of a character set in certain font may be embedded. This is effective font embedment when the storage capacity and processing speed of an information processing apparatus, a network transmission speed, etc., are highly advanced. In this case, in the process in FIG. 34, it may be determined whether a font associated with text to be edited is new without considering overlapping of character codes, and, if a new type of font is employed, font information may be embedded.

Other Embodiments

In the present invention, all or part of functions realized in one of devices in the above embodiment may be executed by causing another device to perform all or part of the functions. For example, by executing a part of a function performed in a host computer in another information processing apparatus such as a printer or server, a characteristic function may be realized.

In addition, the present invention can also be realized by providing a system or apparatus with a storage medium (or recording medium) storing program code of software realizing the functions of the above embodiments, and reading and executing, by a computer (or a CPU or MPU) of the system or apparatus, the program code stored in the storage medium.

In this case, the program read from the storage medium, itself, realizes the functions of the embodiments. Thus, the storage medium storing the program code is included in the present invention. In addition, the present invention includes not only a case in which the computer executes the read program code, whereby the functions of the embodiments are realized, but also a case in which, based on instructions of the program code, an OS or the like activated on the computer performs all or part of actual processing, whereby the processing realizes the functions of the embodiments.

Furthermore, the present invention includes a case in which, after the program code read from the storage medium is written in a storage medium provided in an add-in card inserted in the computer or an add-in unit connected to the computer, a CPU or the like of the add-in card or add-in unit performs all or part of actual processing in accordance with instructions of the program code, whereby the processing realizes the functions of the embodiments.

The present invention can be achieved such that the program code of the software realizing the functions of the embodiments is delivered through a network, whereby the program code is stored in a hard disk in the system or apparatus, a storage device such as a memory, or a storage medium such as CD-RW or CD-R, and a computer (or a CPU or MPU) in the system or apparatus reads and executes the program code stored in the storage device or storage medium.

According to the above described embodiments, embedding of font information is controlled, based on the knowledge of a particular output terminal's (i.e., printer) characteristics, so that a user is prompted whether or not to embed particular fonts on a case-by-case basis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-291450 filed Oct. 4, 2004, which is hereby incorporated by reference herein in its entirety.

What is claimed is:

1. An information processing apparatus including a processor and a memory, the information processing apparatus capable of embedding font information in an electronic document, the information processing apparatus comprising:
   an editor that edits, based upon editing instructions, an electronic document which already exists and in which any fonts are already embedded;
   a first determiner that determines whether the editing instructions are reflected in characters of the electronic document;
   a controller that, based on the editing instructions and the font which is already embedded in the electronic document, causes querying to determine whether font information is to be embedded in the electronic document by displaying the font information which is not embedded and the font information which is partly embedded in identifiable form; and
   an embedder that embeds, in the electronic document, the font information based on a specified font,
   wherein, when the first determiner determines that the editing instructions are reflected in the characters, the controller causes the querying, and when the first determiner determines that the editing instructions are not reflected in the characters, the controller does not cause the querying.

2. The information processing apparatus according to claim 1, wherein the editing instructions are reflected in characters, graphic forms, or both, in the electronic document.

3. The information processing apparatus according to claim 1, wherein:
   the controller displays a screen for specifying additional fonts.

4. The information processing apparatus according to claim 1, further comprising a listing processor for listing fonts,
   wherein, the first determiner determines whether font information of the characters reflecting the editing instructions is included in a subset font of the electronic document,
   wherein, when the first determiner determines that the font information is included, the listing processor lists fonts corresponding to the characters reflecting the editing instructions, and
   wherein, the controller, based on the listed fonts, displays an additional-font directing screen.

5. The information processing apparatus according to claim 1, wherein the first determiner determines whether the font information corresponding to the characters reflecting the editing instructions is included in a subset font already recorded in the electronic document.

6. The information processing apparatus according to claim 1, further comprising:
   a second determiner that determines whether storing of the electronic document or termination of the editing has been directed,
   wherein, when the second determiner determines that storing of the electronic document or termination of the editing has not been directed, the controller causes the querying.

7. The information processing apparatus according to claim 1, further comprising:
   a third determiner that detects unembedment of a font corresponding to a character reflecting no editing instruction,
   wherein, when the third determiner detects the unembedment of the font, the controller causes querying capable of directing embedment of font information of the unembedded font.

8. The information processing apparatus according to claim 1, further comprising:
   a fourth determiner that determines unnecessary font information in response to the editing of the electronic document containing the editing instructions; and
   a deleter that deletes, from the electronic document, the unnecessary font information.

9. The information processing apparatus according to claim 1, wherein the querying whether the font information is to be embedded is a representation capable of directing embedding of new font information.

10. The information processing apparatus according to claim 1, wherein the editing instructions include character addition or change of a font corresponding to a character.

11. A method for controlling an information processing apparatus including a processor and a memory for embedding font information in an electronic document, the information processing method comprising:
   an editing step that edits, based upon editing instructions, an electronic document which already exists and in which any fonts are already embedded;
   a first determining step that determines whether the editing instructions are reflected in characters of the electronic document;
   a control step that, based on editing instructions and the font which is already embedded in the electronic document, causes querying to determine whether font information is to be embedded in the electronic document by displaying the font information which is not embedded and the font information which is partly embedded in identifiable form; and
   an embedding step that embeds, in the electronic document, the font information based on a specified font,
   wherein, when the first determining step determines that the editing instructions are reflected in the characters, the control step causes the querying, and when the first determining step determines that the editing instructions are not reflected in the characters, the control step does not cause the querying.

12. The information processing method according to claim 11, wherein the editing instructions are reflected in characters, graphic forms, or both, in the electronic document.

13. The information processing method according to claim 12, further comprising:

a listing step that lists fonts, wherein, the first determining step determines whether font information of the characters reflecting the editing instructions is included in a subset font of the electronic document, and wherein, when the first determiner determines that the font information is included, the listing step lists fonts corresponding to the characters reflecting the editing instructions, and wherein, based on the listed fonts, the control step displays specifying an additional-font directing screen.

14. The information processing method according to claim 12, wherein the first determining step determines whether the font information corresponding to the characters reflecting the editing instructions is included in a subset font already recorded in the electronic document.

15. The information processing method according to claim 11, wherein:

the control step includes a step that displays a screen for specifying additional fonts.

16. The information processing method according to claim 11, further comprising:

a second determining step that determines whether or not storing of the electronic document or termination of the editing has been directed, wherein, when the second determining step determines that storing of the electronic document or termination of the editing has not been directed, the controller causes the querying.

17. The information processing method according to claim 11, further comprising:

a third determining step that determines unembedment of a font corresponding to a character reflecting no editing instruction, wherein, when the third determining step determines that the unembedment of the font, the control step causes querying capable of directing embedment of font information of the unembedded font.

18. The information processing method according to claim 11, further comprising:

a fourth determining step that determines unnecessary font information in response to the editing of the electronic document containing the editing instructions; and a deleting step that deletes, from the electronic document, the unnecessary font information.

19. The information processing method according to claim 11, wherein the querying whether the font information is to be embedded is a representation capable of directing embedment of new font information.

20. The information processing method according to claim 11, wherein the editing instructions include character addition or change of a font corresponding to a character.

21. A computer-readable recording medium storing a program that causes a computer to execute a method for controlling an information processing apparatus including a processor and a memory for embedding font information in an electronic document, the method comprising:

an editing step that edits, based upon editing instructions an electronic document which already exists and in which any fonts are already embedded;

a first determining step that determines whether the editing instructions are reflected in characters of the electronic document;

a control step that, based on editing instructions and the font which is already embedded in the electronic document, causes querying to determine whether font information is to be embedded in the electronic document by displaying the font information which is not embedded and the font information which is partly embedded in identifiable form; and an embedding step that embeds, in the electronic document, the font information based on a specified font, wherein, when the first determining step determines that the editing instructions are reflected in the characters, the control step causes the querying, and when the first determining step determines that the editing instructions are not reflected in the characters, the control step does not cause the querying.

* * * * *